(12) United States Patent
Pike et al.

(10) Patent No.: US 7,661,370 B2
(45) Date of Patent: Feb. 16, 2010

(54) DESIGN OF A LARGE LOW MAINTENANCE BATTERY PACK FOR A HYBRID LOCOMOTIVE

(75) Inventors: James A. Pike, Fairview, PA (US); Brian L. Jarrett, Erie, PA (US)

(73) Assignee: Railpower, LLC, Nicholasville, KY (US)

( * ) Notice: Subject to any disclaimer, the term of this patent is extended or adjusted under 35 U.S.C. 154(b) by 257 days.

(21) Appl. No.: 11/551,038

(22) Filed: Oct. 19, 2006

(65) Prior Publication Data

US 2007/0144804 A1    Jun. 28, 2007

Related U.S. Application Data

(60) Provisional application No. 60/728,567, filed on Oct. 19, 2005.

(51) Int. Cl.
*B61C 3/00* (2006.01)
*H02J 7/04* (2006.01)
*H02J 7/16* (2006.01)

(52) U.S. Cl. ............................ 105/50; 105/49; 320/150

(58) Field of Classification Search ................ 320/150, 320/104; 105/61, 104, 132, 35, 36, 50, 133, 105/139, 136, 49
See application file for complete search history.

(56) References Cited

U.S. PATENT DOCUMENTS

| | | | |
|---|---|---|---|
| 384,580 A | 6/1888 | Julien | |
| 744,187 A | 11/1903 | Gibbs | |
| 1,199,752 A | 10/1916 | Baker | |
| 1,377,087 A | 5/1921 | Manns | |
| 1,535,175 A | 4/1925 | Mancha | |
| 2,403,933 A | 4/1946 | Lillquist | |
| 2,472,924 A | 6/1949 | Schwendner | |
| 2,510,753 A | 6/1950 | Multhaup | |
| 2,704,813 A | 3/1955 | Stamm | |
| 3,169,733 A | 2/1965 | Barrett, Jr. | |
| 3,443,115 A | 5/1969 | Timmerman, Jr. | |
| 3,569,810 A | 3/1971 | Thiele | |
| 3,596,154 A | 7/1971 | Gurwicz et al. | |
| 3,668,418 A | 6/1972 | Godard | |
| 3,728,596 A | 4/1973 | Hermansson et al. | |
| 3,737,745 A | 6/1973 | Chevaugeon et al. | |
| 3,792,327 A | 2/1974 | Waldorf | |
| 3,832,625 A | 8/1974 | Gyugyi | |

(Continued)

FOREIGN PATENT DOCUMENTS

CA    1283472    10/1987

(Continued)

OTHER PUBLICATIONS

Supplemental Declaration of Frank Donnelly Under 37 CFR § 1.98; dated Jan. 25, 2007 for U.S. Appl. No. 11/070,848, 2 pages.

(Continued)

*Primary Examiner*—Edward Tso
*Assistant Examiner*—Ahmed Omar
(74) *Attorney, Agent, or Firm*—King & Schickli, PLLC

(57) ABSTRACT

The present invention is directed to systems for prolonging battery life, such as maintaining battery cell temperatures in battery packs within specified limits, providing vibration and shock resistance, and/or electrically isolating groups of batteries from nearby conductive surfaces.

20 Claims, 16 Drawing Sheets

U.S. PATENT DOCUMENTS

| | | |
|---|---|---|
| 3,898,937 A | 8/1975 | Johnson |
| 3,919,948 A | 11/1975 | Kademann |
| 3,930,189 A | 12/1975 | Smith |
| 3,970,160 A | 7/1976 | Nowick |
| 3,982,164 A | 9/1976 | de Buhr |
| 3,997,822 A | 12/1976 | Logston et al. |
| 4,035,698 A | 7/1977 | Soderberg |
| 4,070,562 A | 1/1978 | Kuno et al. |
| 4,075,538 A | 2/1978 | Plunkett |
| 4,090,577 A | 5/1978 | Moore |
| 4,095,147 A | 6/1978 | Mountz |
| 4,096,423 A | 6/1978 | Bailey et al. |
| 4,107,402 A | 8/1978 | Dougherty et al. |
| 4,152,758 A | 5/1979 | Bailey et al. |
| 4,199,037 A | 4/1980 | White |
| 4,204,143 A | 5/1980 | Coleman |
| 4,217,527 A | 8/1980 | Bourke et al. |
| 4,284,936 A | 8/1981 | Bailey et al. |
| 4,309,645 A | 1/1982 | De Villeneuve |
| 4,344,139 A | 8/1982 | Miller et al. |
| 4,347,569 A | 8/1982 | Allen, Jr. et al. |
| 4,369,397 A | 1/1983 | Read |
| 4,417,194 A | 11/1983 | Curtiss et al. |
| 4,423,362 A | 12/1983 | Konrad et al. |
| 4,471,276 A | 9/1984 | Cudlitz |
| 4,471,421 A | 9/1984 | Brown et al. |
| 4,495,449 A | 1/1985 | Black et al. |
| 4,498,016 A | 2/1985 | Earleson et al. |
| 4,523,134 A | 6/1985 | Kinoshita et al. |
| 4,644,232 A | 2/1987 | Nojiri et al. |
| 4,700,283 A | 10/1987 | Tsutsui et al. |
| 4,701,682 A | 10/1987 | Hirotsu et al. |
| 4,719,861 A | 1/1988 | Savage et al. |
| 4,799,161 A | 1/1989 | Hirotsu et al. |
| 4,896,090 A | 1/1990 | Balch et al. |
| 4,900,944 A | 2/1990 | Donnelly |
| 4,936,610 A | 6/1990 | Kumar et al. |
| 4,941,099 A | 7/1990 | Wood et al. |
| 4,944,539 A | 7/1990 | Kumar et al. |
| 4,950,964 A | 8/1990 | Evans |
| 4,961,151 A | 10/1990 | Early et al. |
| 5,129,328 A | 7/1992 | Donnelly |
| 5,212,431 A | 5/1993 | Origuchi et al. |
| 5,264,764 A | 11/1993 | Kuang |
| 5,281,900 A | 1/1994 | Park |
| 5,289,093 A | 2/1994 | Jobard |
| 5,306,972 A | 4/1994 | Hokanson et al. |
| 5,317,669 A | 5/1994 | Anderson et al. |
| 5,331,261 A | 7/1994 | Brown et al. |
| 5,332,630 A | 7/1994 | Hsu |
| 5,343,970 A | 9/1994 | Severinsky |
| 5,359,228 A | 10/1994 | Yoshida |
| 5,376,868 A | 12/1994 | Toyoda et al. |
| 5,392,716 A | 2/1995 | Orschek et al. |
| 5,424,948 A | 6/1995 | Jordan, Jr. |
| 5,428,538 A | 6/1995 | Ferri |
| 5,436,538 A | 7/1995 | Garvey et al. |
| 5,436,540 A | 7/1995 | Kumar |
| 5,436,548 A | 7/1995 | Thomas |
| 5,453,672 A | 9/1995 | Avitan |
| 5,480,220 A | 1/1996 | Kumar |
| 5,508,924 A | 4/1996 | Yamashita |
| 5,510,203 A | 4/1996 | Hamada et al. |
| 5,510,693 A | 4/1996 | Theobald |
| 5,511,749 A | 4/1996 | Horst et al. |
| 5,528,148 A | 6/1996 | Rogers |
| 5,564,795 A | 10/1996 | Engle |
| 5,568,023 A | 10/1996 | Grayer et al. |
| 5,580,677 A | 12/1996 | Morishita et al. |
| 5,580,685 A | 12/1996 | Schenk et al. |
| 5,585,706 A | 12/1996 | Avitan |

| | | | |
|---|---|---|---|
| 5,589,743 A | 12/1996 | King | |
| 5,610,499 A | 3/1997 | Rogers | |
| 5,610,819 A | 3/1997 | Mann et al. | |
| 5,629,567 A | 5/1997 | Kumar | |
| 5,629,596 A | 5/1997 | Iijima et al. | |
| 5,629,601 A | 5/1997 | Feldstein | |
| 5,631,532 A | 5/1997 | Azuma et al. | |
| 5,646,510 A | 7/1997 | Kumar | |
| 5,659,240 A | 8/1997 | King | |
| 5,661,378 A | 8/1997 | Hapeman | |
| 5,677,610 A | 10/1997 | Tanamachi et al. | |
| 5,685,507 A | 11/1997 | Horst et al. | |
| 5,696,438 A | 12/1997 | Hamilton | |
| 5,698,955 A | 12/1997 | Nii | |
| 5,710,699 A | 1/1998 | King et al. | |
| 5,735,215 A | 4/1998 | Tegeler | |
| 5,751,137 A | 5/1998 | Kiuchi et al. | |
| 5,765,656 A | 6/1998 | Weaver | |
| 5,820,172 A | 10/1998 | Brigham et al. | |
| 5,856,037 A | 1/1999 | Casale et al. | |
| 5,898,281 A | 4/1999 | Bossoney et al. | |
| 5,898,282 A | 4/1999 | Drozdz et al. | |
| 5,939,861 A | 8/1999 | Joko et al. | |
| 5,964,309 A | 10/1999 | Kimura et al. | |
| 5,992,950 A | 11/1999 | Kumar et al. | |
| 5,998,880 A | 12/1999 | Kumar | |
| 6,012,011 A | 1/2000 | Johnson | |
| 6,021,251 A | 2/2000 | Hammer et al. | |
| 6,023,137 A | 2/2000 | Kumar et al. | |
| 6,025,086 A | 2/2000 | Ching | |
| 6,027,181 A | 2/2000 | Lewis et al. | |
| 6,068,944 A * | 5/2000 | Witzigreuter | 429/27 |
| 6,082,834 A | 7/2000 | Kolbe et al. | |
| 6,104,148 A | 8/2000 | Kumar et al. | |
| 6,175,272 B1 | 1/2001 | Takita | |
| 6,189,635 B1 * | 2/2001 | Schuler et al. | 180/68.5 |
| 6,208,097 B1 | 3/2001 | Reddy et al. | |
| 6,211,646 B1 | 4/2001 | Kouzu et al. | |
| 6,218,807 B1 | 4/2001 | Sakaue et al. | |
| 6,274,998 B1 | 8/2001 | Kaneko et al. | |
| 6,308,639 B1 | 10/2001 | Donnelly et al. | |
| 6,331,365 B1 | 12/2001 | King | |
| 6,359,346 B1 | 3/2002 | Kumar | |
| 6,367,891 B1 | 4/2002 | Smith et al. | |
| 6,371,573 B1 | 4/2002 | Goebels et al. | |
| 6,384,489 B1 | 5/2002 | Bluemel et al. | |
| 6,405,705 B1 | 6/2002 | Dunsworth et al. | |
| 6,408,766 B1 | 6/2002 | McLaughlin et al. | |
| 6,417,646 B1 | 7/2002 | Huykman et al. | |
| 6,421,618 B1 | 7/2002 | Kliman et al. | |
| 6,441,581 B1 | 8/2002 | King et al. | |
| 6,449,536 B1 | 9/2002 | Brousseau et al. | |
| 6,456,674 B1 | 9/2002 | Horst et al. | |
| 6,456,908 B1 | 9/2002 | Kumar | |
| D464,622 S | 10/2002 | Donnelly | |
| 6,470,245 B1 | 10/2002 | Proulx | |
| 6,486,568 B1 | 11/2002 | King et al. | |
| 6,497,182 B2 | 12/2002 | Melpolder et al. | |
| 6,507,506 B1 | 1/2003 | Pinas et al. | |
| 6,532,405 B1 | 3/2003 | Kumar et al. | |
| 6,537,694 B1 | 3/2003 | Sugiura et al. | |
| 6,564,172 B1 | 5/2003 | Till | |
| 6,581,464 B1 | 6/2003 | Anderson et al. | |
| 6,591,758 B2 | 7/2003 | Kumar | |
| 6,608,396 B2 | 8/2003 | Downer et al. | |
| 6,611,116 B2 | 8/2003 | Bachman et al. | |
| 6,612,245 B2 | 9/2003 | Kumar et al. | |
| 6,612,246 B2 | 9/2003 | Kumar | |
| 6,615,118 B2 | 9/2003 | Kumar | |
| 6,618,662 B2 | 9/2003 | Schmitt et al. | |
| 6,627,345 B1 | 9/2003 | Zemlok et al. | |
| 6,634,303 B1 | 10/2003 | Madsen et al. | |
| 6,653,002 B1 | 11/2003 | Parise | |

| | | | |
|---|---|---|---|
| 6,658,331 B2 | 12/2003 | Horst et al. | |
| 6,678,972 B2 | 1/2004 | Naruse et al. | |
| 6,688,481 B1 | 2/2004 | Adner et al. | |
| 6,691,005 B2 | 2/2004 | Proulx | |
| 6,697,716 B2 | 2/2004 | Horst | |
| 6,725,134 B2 | 4/2004 | Dillen et al. | |
| 6,728,606 B2 | 4/2004 | Kumar | |
| 6,737,822 B2 | 5/2004 | King | |
| 6,765,315 B2 | 7/2004 | Hammerstrom et al. | |
| 6,812,656 B2 | 11/2004 | Donnelly et al. | |
| 6,821,671 B2 | 11/2004 | Hinton et al. | |
| 6,823,835 B2 | 11/2004 | Dunsworth et al. | |
| 6,829,529 B2 | 12/2004 | Trefzer et al. | |
| 6,829,556 B2 | 12/2004 | Kumar | |
| 6,879,054 B2 | 4/2005 | Gosselin | |
| 6,885,920 B2 | 4/2005 | Yakes et al. | |
| 6,909,200 B2 | 6/2005 | Bouchon | |
| 6,909,201 B2 | 6/2005 | Murty et al. | |
| 6,909,959 B2 | 6/2005 | Hallowell | |
| 6,941,218 B2 | 9/2005 | Wolf et al. | |
| 6,973,880 B2 | 12/2005 | Kumar | |
| 6,984,946 B2 | 1/2006 | Donnelly et al. | |
| 7,064,507 B2 | 6/2006 | Donnelly et al. | |
| 7,084,602 B2 | 8/2006 | Donnelly | |
| 7,102,313 B2 | 9/2006 | Kadota et al. | |
| 7,124,691 B2 | 10/2006 | Donnelly et al. | |
| 2002/0190525 A1 | 12/2002 | Worden et al. | |
| 2003/0151387 A1 | 8/2003 | Kumar | |
| 2003/0226653 A1 | 12/2003 | Takedomi et al. | |
| 2003/0233959 A1 | 12/2003 | Kumar | |
| 2004/0133315 A1 | 7/2004 | Kumar et al. | |
| 2005/0206230 A1 | 9/2005 | Donnelly | |
| 2005/0206331 A1 | 9/2005 | Donnelly | |
| 2005/0251299 A1 | 11/2005 | Donnelly | |
| 2005/0269995 A1* | 12/2005 | Donnelly et al. | 320/150 |
| 2005/0279242 A1 | 12/2005 | Maier et al. | |
| 2005/0279243 A1 | 12/2005 | Bendig et al. | |
| 2006/0001399 A1 | 1/2006 | Salasoo et al. | |
| 2006/0061307 A1 | 3/2006 | Donnelly | |
| 2006/0076171 A1 | 4/2006 | Donnelly et al. | |
| 2006/0091832 A1 | 5/2006 | Donnelly | |
| 2006/0260265 A1* | 11/2006 | Zatkulak | 52/745.06 |
| 2007/0129000 A1* | 6/2007 | Rasmussen et al. | 454/184 |

FOREIGN PATENT DOCUMENTS

| | | |
|---|---|---|
| CA | 2411132 | 11/2002 |
| EP | 0 348 938 | 1/1990 |
| GB | 873167 | 3/1960 |
| GB | 1129709 | 11/1966 |
| GB | 1 312 699 | 10/1970 |
| GB | 2 005 205 A | 9/1977 |
| WO | WO 30/072388 | 9/2003 |
| WO | WO 2004/042890 | 5/2004 |
| WO | WO 2005/030550 | 4/2005 |
| WO | WO 2005/079504 | 9/2005 |
| WO | WO 2005/084335 | 9/2005 |
| WO | WO 2005/086910 | 9/2005 |
| WO | WO 2005/097573 | 10/2005 |
| WO | WO 2005/114810 | 12/2005 |
| WO | WO2005/114811 | 12/2005 |
| WO | WO 2006/020587 | 2/2006 |
| WO | WO 2006/020667 | 2/2006 |
| WO | WO 2006/028638 | 3/2006 |
| WO | WO/2006/116479 | 11/2006 |

OTHER PUBLICATIONS

U.S. Appl. No.11/131,917, Donnelly.
U.S. Appl. No. 11/131,930, Watson.
U.S. Appl. No. 11/143,252, Donnelly.
U.S. Appl. No. 11/411,986, Donnelly.
U.S. Appl. No. 11/411,987, Donnelly.
U.S. Appl. No. 11/412,071, Donnelly.
U.S. Appl. No. 11/468,235, Swan.
"Improving the Valve-Regulated Lead Acid Battery", P.T. Moseley, Journal of Power Sources 88 (2000) 71-77.
"Keeping Up the Pressure-Strategies to Maintain Plate-Group Pressure and Extend the Cycle Life of VRLA Batteries", M.J. Weighall, Journal of Power Sources 95 (2001) 209-217.
"Motor Control Electronics Handbook" edited by Richard Valentine, McGraw Hill 1998, ISBN 0-07-066810-8, 1998, 31 pages.
"Progress in Overcoming the Failure Modes Peculiar to VRLA Batteries", A. Cooper, P.T. Moseley, Journal of Power Sources 113 (2003) 200-208.
"Research Results from the Advanced Lead-Acid Battery Consortium Point the Wy to Longer Life and Higher Specific Energy for Lead/Acid Electric-vehicle Batteries", P.T. Moseley, Journal of Power Sources 73 (1998) 122-126.
"The Car and Locomotive Encyclopedia" by Kalmbach Publishing Company, 1980, 3 pages.
"VRLA Traction", First International Symposium on the Use of VRLA Batteries in Traction Application, Honolulu, Jun. 2005.
"Comparative Economic Assessment of a Natural Gas Fueled Locomotive with On-Board CNG Storage to Diesel and LNG Variants", Donnelly et al, IEEE/ASME Joint Railroad Conference, Baltimore, Apr. 1995, 30 pages.
Design of Switched Reluctance Motors and Development of a Universal Controller for Switched Reluctance and Permanent Magnet Brushless DC Motors', Phd Dissertation, Virginia Polytechnic Institute and State University, Prahveen Vijayraghavan, Blacksburg, VA, Nov. 2001, 215 pages.
"Development of a New Battery System for Hybrid Vehicle", Tomokazu Yamauchi et al, Toyota, presented at the EVS 17 in Montreal, Oct. 2000, 7 pages.
"Lead-Acid Battery State of Charge vs. Voltage", Richard Perez, Home Power #36, Aug./Sep. 1993, 5 pages.
"Li-Ion Battery-Powered Buck-Boost Regulator Minimizes Portable Product Size", Chen, IIC-China/ESC-China Conference Proceedings, 2002, 5 pages.
"Linear/Switchmode Voltage Regulator Handbook" Motorola, Inc. 1982, 3 pages.
"LNG as a Fuel for Railroads: Assessment of Technology Status and Economics", Pera and Moyer, Acurex Corporation, 1993, Gas Research Institute contract No. 5091-292-2153, 122 pages.
"Locomotive Energy Storage System," Advanced Railway Technology, Inc. (Dec. 1985), 22 pages.
"Supercapacitive Energy Storage for Diesel-Electric Locomotives", Destraz, Barrade and Rufer, Swiss Federal Institute of Technology, paper presented at SPEEDAM 2004, Jun. 16, Capri, Italy, 6 pages.
C.E. Band et al., "Development of and Operational Experience with a High Powered D.C. Chopper for 1500 Volt D.C. Railway Equipment," Institution of Electrical Engineers Conference Publication 53 on Power Thyristors and Their Applications, Part 1 (May 1969), 1-page; or Band, C.E. et al., "Development of and Operational Experience with a High Powered D.C. Chopper for 1500 Volt D.C. Railway Equipment," Institution of Electrical Engineers Conference Publication 53 on Power Thyristors and Their Applications, Part 1 (May 1969), pp. 277-288.
Declaration of Frank Donnelly Under 37 CFR § 1.98 Jan. 25, 2007.
Declaration of Ronald Bailey under 37 CFR § 1.98 dated Dec. 3, 2004 for U.S. Appl. No. 10/650,011, 3 pages.
Hassan Moghbelli et al., "Chopper Design for NICTD Locomotives," Proceedings of the 1993 IEEE/ASME Joint Railroad Conference, Apr. 1993, pp. 67-75.
Kostic et al., "An Analytic Solution of the Choppers Ripple Currents," Proceedings of the 1993 IEEE/ASME Joint Railroad Conference, Apr. 1993, pp. 103-107.
M.J. Hapeman et al., "Diesel Electric Locomotive Propulsion Systems—A Look into the Future," IEEE Technical Papers Presented at the 1985 Joint ASME/IEEE Railroad Conference, New York City, NY, Apr. 16-18, 1985, pp. 108-115.

Mendler, "The Technological Opportunities of Hybrid Electric Vehicles," Society of Automotive Engineers, Inc. (1996), pp. 1-16.

Mercer, "Innovative Use of Horsepower—Hybrid Bus Powered by Gas Turbine," Diesel Progress (Dec. 1997), pp. 56-57.

Nene, "Advanced Propulsion Systems for Urban Rail Vehicles: Chapter 2: DC Drives with a Chopper Controller," Prentice-Hall, Inc. (1985), pp. 18-45.

Press Release: "French Railway Company Voies Ferees Legeres et Industielles (VFLI) Puts Its Trust in Deutch Engines", Jun. 2003, 2 pages.

Railway Age, "Switchers, the Gen-Set generation", Simmons-Boardman Publishing Corporation, vol. 207 No. 3, copyright 2006, 1 page.

Thermal Evaluation of the Honda Insight Battery Pack M.D. Zolot et. al. National Renewable Energy Laboratory, Presented at the 36th Intersociety Energy Conversion Engineering Conference, Savannah Georgia, Jul. 29 to Aug. 2, 2001, 9 pages.

Thompson, "Electric Transportation," International Textbook Co., Scranton, Pa; (1st Ed., 1940), pp. 254-262.

* cited by examiner

DESIGN OF A LARGE LOW MAINTENANCE BATTERY PACK FOR A HYBRID LOCOMOTIVE

CROSS REFERENCE TO RELATED APPLICATION

The present application claims the benefits, under 35 U.S.C. §119(e), of U.S. Provisional Application Ser. No. 60/728,567, filed Oct. 19, 2005, entitled "Design of a Large Low Maintenance Battery Pack for a Hybrid Locomotive" to Jarrett et al., which is incorporated herein by this reference.

FIELD

The present invention relates generally to the design of a large battery pack suitable for a hybrid locomotive and specifically to a battery pack using a predominantly free convection cooling system.

BACKGROUND

The use of energy storage batteries in combination with a generator is known for automobiles, buses and other road and highway vehicles. Electric batteries have been used to store electric power to drive electric locomotives as, for example, disclosed by Manns in U.S. Pat. No. 1,377,087 which is incorporated herein by reference. Donnelly has disclosed the use of a battery-dominant hybrid locomotive which has a ratio of energy storage capacity to charging power in the range of 4 to 40 hours in U.S. Pat. No. 6,308,639 which is also incorporated herein by reference.

One of the principal objectives of hybrid locomotive design is to create a locomotive that can be operated in such a way as to maximize the lifetime of its energy storage unit. This is because the cost structure of an energy storage unit such as, for example, a battery pack or capacitor bank is primarily one of capital cost and secondarily of operating costs. It is known, for example, that operating a lead-acid battery pack in a preferred state-of-charge ("SOC") range or with a preferred charging algorithm or with both tends to extend serviceable lifetime of cells in cyclical service towards that of float service.

Large energy storage battery systems are known, for example, from diesel submarines. In this application, a pack of large storage batteries are used to provide power principally when the submarine is operating underwater. These submarine battery packs are designed to provide high energy storage capacity for extended underwater operations during which the battery pack cannot be recharged. Battery pack cost and lifetime are generally not major concerns.

In the late 1990s, a large stationary battery system was installed at the island village of Metlakatla, Ak. The 1.4 MW-hr, 756 volt battery system was designed to stabilize the island's power grid providing instantaneous power into the grid when demand was high and absorbing excess power from the grid to allow its hydroelectric generating units to operate under steady-state conditions. Because the battery pack is required to randomly accept power as well as to deliver power on demand to the utility grid, it is continuously operated at between 70 and 90% state-of-charge. Equalization charges are conducted during maintenance periods scheduled only twice each year.

It has long been thought that to achieve optimum life and performance from a lead-acid battery, it is necessary to float the battery under rigid voltage conditions to overcome self-discharge reactions while minimizing overcharge and corrosion of the cell's positive grid. This has resulted in batteries being used primarily in a standby mode. As used in a hybrid locomotive or as a power grid storage and control system, the battery is rapidly and continuously cycled between discharge and charge over a preferred range of total charge (the so-called Hybrid Electric Vehicle ["HEV"] duty cycle).

It has been possible to assess aging and performance capabilities over time in this controlled cycling type of service by detailed monitoring. Data has been generated to demonstrate the long-term viability of cells in this type of use, performing functions such as load leveling, peak shaving and power quality enhancement. Detailed examination of the cells plates and separators have shown little wear indicating that controlled operation such as described above can result in battery lifetimes that can approach design lifetimes associated with float service.

However, there remains a need for a more comprehensive procedure suitable for designing large battery pack assemblies with long lifetimes for hybrid locomotives that satisfies a number of additional diverse requirements for locomotive performance, maintenance, safety and cost-effective operation.

A principal design objective for many applications is maximum energy storage capacity. When this objective is achieved, the power output of the battery pack is usually more than sufficient. In many applications, a principal design objective is low capital and operating cost. This usually means a lead-acid battery with some compromise in power or capacity. In applications such as hybrid locomotives used as yard or road switcher locomotives or commuter locomotives, maximum power out is a principal design objective. A further principal design objective is battery pack lifetime since this directly relates to the unit cost of power supplied indirectly through a battery system.

The design objectives of a large battery pack for a hybrid locomotive has a unique set of problems to achieve its principal design goals of high storage capacity, high power on demand, HEV duty cycle, long lifetime and a cost effective design for a large battery pack. These objectives must be met on a locomotive platform subject to shock and vibration as well as extreme changes in ambient temperature conditions. There therefore remains a need for a battery pack design for a hybrid locomotive that is capable of operation requiring a combination of high storage capacity, high power capability for rapid acceleration, long battery pack lifetime, and a low cost capital and replacement cost structure under diverse locomotive operating environments. These and other objectives are met by the design approach described in the present invention.

SUMMARY

These and other needs are addressed by the various embodiments and configurations of the present invention. The present invention is directed generally to a method for design and operation of an energy storage battery pack for a large hybrid vehicle, such as a hybrid locomotive, hybrid gantry crane, maritime vessel, hybrid bus, hybrid subway or hybrid light rail vehicle. The method disclosed herein may also be applied to an energy storage unit comprised of energy storage capacitors.

In one embodiment, a hybrid vehicle is provided that includes:

(a) a prime mover for generating electrical energy;

(b) a battery pack for receiving, storing, and providing, as needed, the electrical energy, the battery pack comprising a number of battery cells; and (c) at least one motor for consuming the electrical energy.

To control operating conditions for the battery cells, the vehicle includes one or more of the following features:

(i) a hood assembly, the hood assembly comprising a chimney vent and hood and wall members respectively defining upper and lower plenums, the upper and lower plenums being in fluid communication with the chimney vent and separated by the wall member, the wall member inhibiting airflow between the upper and lower plenums, and the lower plenum being in fluid communication with and removing heated air from the battery pack, whereby heated air in the upper and/or lower plenums passes, by free convection, through the chimney vent and into the external environment;

(ii) a number of airflow channels in communication with the lower plenum, a first set of airflow channels being positioned between adjacent battery cells and a second set of airflow channels being positioned between battery cells and the wall member, the airflow channels in the first set having a first cross-sectional area normal to the direction of airflow and the airflow channels in the second set having a second cross-sectional area normal to the direction of airflow, wherein the first cross-sectional area is greater than the second cross-sectional area;

(iii) a rack structure, the rack structure comprising a number of vertical and horizontal fire wall members defining a number of containment sections, each section receiving a corresponding set of battery cells, whereby a fire in one section is retarded from spreading to an adjacent section;

(iv) a fan positioned in a fan duct, the fan duct being in communication with the chimney vent, wherein, when the battery pack is less than a first temperature, the fan is disabled and removal of heated air from the battery pack is done by free convection alone and wherein, when the battery pack is more than a second temperature, the fan is enabled and removal of heated air from the battery pack is done by forced convection;

(v) a number of vertical and longitudinal shock absorbers, a set of vertical and longitudinal shock absorbers being positioned in each containment section to absorb at least a portion of shock imparted to the absorbers by movement of and impacts to the vehicle;

(vi) an electrically insulating material positioned between the rack structure and a supporting deck of the vehicle and/or between each cell and a supporting member in the rack structure; and (vii) a support plate structure supporting the battery rack, the support plate structure being operable to permit and limit movement of the battery rack relative to the support plate structure.

The battery pack is preferably operated to maintain cells within a specified temperature difference relative to all other battery cells. This is done by removing thermal energy generated within individual cells primarily by free convection cooling means applied to selected outside surfaces of the cells. This cooling system may supplemented by forced convective cooling during more severe portions of the duty cycle and or in severe environmental conditions.

The temperature operating range for a large hybrid locomotive battery pack is typically between minus 40° C. and plus 50° C. The temperature differential between any individual cells is preferably less than about 5° C. and more preferably less than about 3° C. The temperature of individual battery cells is maintained by stacking several battery cells in columns in a specially designed rack and allowing natural convection to create a moderate flow of air up the sides of the batteries, preferably the sides of the cells perpendicular to the orientation of the internal plate pairs. This practice of tightly controlling the temperature differences amongst cells of the pack extends the useful lifetime of the battery pack as a whole.

In one configuration, the invention has combination of natural convection and forced convection features that minimize the need for forced convection. This can reduce the amount of auxiliary electrical power needed to keep the battery system cooled. The air enters through the base louvers and flows along the rack base and enters natural convection gaps between the stacked battery cells. Vertical solid wall plates are used to provide fire walls and provide vertical flow barriers for the convecting air. The batteries act as constant heat flux sources and are preferably oriented in the rack so the largest surface area sides are exposed to the natural convection air gaps. The air flows vertically up into a plenum that guides the air to the fan duct which provides a chimney effect.

Another important natural convection feature is the upper plenum positioned between the lower plenum and the hood member. A louvered soffit can be positioned on the side of the upper plenum to allow air to enter this cavity and naturally or freely convect to the fan duct and enter the duct via slots that are cut into the duct wall. These slots are located vertically above the fan plane so when the fan is running it will not draw air from this cavity but pull air from the area below the plenum where the battery cells are contained. This overall features provides a means for minimizing the solar radiation heat source that is created in the upper plenum by the solar load on the outer hood surface. The hood outer surface can, for example, be painted with a high reflectivity paint. The hood inner surface and the upper wall between the upper and lower plenums can also be thermally insulated. When the solar load heats the hood assembly, the air in the upper plenum between the hood member and the dividing wall member the heated air will naturally convect from the soffit opening and out the duct slots and subsequently out the duct. The air will also provide an additional insulating layer between the warm hood member and the dividing wall.

In another configuration, a similar concept is used for the side(s) of the hood which is typically the battery pack hood doors. The doors can be double walled with the same insulation features described for the hood and plenum. The bottom and tops of the double paneled doors preferably have air flow slots that allow the air to naturally convect vertically between the door walls. The top slots can open into the plenum. By opening into the lower plenum, the door interiors can be protected from rain, snow, dust and other debris and will have the benefits of the forced air convection created by the fans when they are running.

In another configuration, the air gaps or channels between the battery cells are sized to optimize the natural convection cooling for these constant heat sources. Where two adjacent cells do not have a vertical fire wall, they both provide heat to the gap. This shared gap is moderately larger than the gap that is needed between a battery and a fire wall. These gaps should be sized for optimum natural convection cooling since gaps that are too large will result in natural convection re-circulation. The horizontal fire walls are slotted to match the air gaps between the batteries while maintaining some fire wall capability.

In another configuration, during extreme temperature conditions one or more fans are activated, and air is forced through the air gaps. The fan or fans are sized to provide sufficient velocity to keep the battery cells within a preferred temperature range in these extreme conditions.

In another configuration, a system of shock absorbers is used to control longitudinal, vertical and lateral shock and vibration loading of the entire battery pack so as to isolate the cells from mechanical shock and vibration, such as is commonly experienced in rail systems. This control of mechanical environment also acts to extend the lifetime of the battery cells and the battery pack as a whole.

In yet another configuration, a small number of cells (typically between about two and about six) are mounted on a tray that allows battery cells to be readily inspected, serviced and/or replaced no matter where in the battery pack they are located.

In yet another configuration, the trays are at least a part of the system to provide electrical isolation of individual battery cells from each other so as to avoid the possibilities for inadvertently shorting out battery cells. This design feature is important in a battery pack where the cells are commonly connected electrically in series so there can be a large voltage drop across the battery pack. This feature also acts to extend the lifetime of the battery cells, and the battery pack as a whole, by minimizing or eliminating inadvertent short circuits which can cause one or a group of cells to overheat.

In a second embodiment, a combination of the above procedures are used collectively to substantially maximize the ampere-hour lifetime of a battery pack. First, individual battery cells are maintained within a specified temperature difference range of each other as described above. Second, the temperature level of all the cells is maintained within a second predetermined range by controlling the inflow and outflow of air to the battery pack compartment in response to ambient temperature conditions. Third, the shock and vibration environment of individual battery cells are controlled within predetermined maximum values. Fourth, the battery pack is operated such that its state of charge ("SOC") is preferably between about 20% to about 95% and more preferably between about 50% and about 95%. This practice reduces the tendency of the condition of individual battery cells to diverge, thereby requiring fewer equalization charges which can reduce overall battery pack lifetime. Fifth, the battery pack is operated to avoid deep discharging the battery cells for example below about 20% SOC so as not to cause unnecessary level of stress on the cell plates which tends to reduce battery lifetime. Sixth, when it is necessary to overcharge the battery pack (perform an equalization charge), a current interrupt charging algorithm is used. This type of charging algorithm is known to significantly extend battery cell lifetime because it allows the cells to cool down during charging and avoid the oxygen recombination cycle which leads to early failure of the negative plate by oxidation of the sulfuric acid to sulfate. Seventh, it is also preferable to perform equalization charges at a high rate of current and/or controlled over-voltage so as to more evenly pass current through the plates, a practice which is also known to extend cell lifetime.

When one or more of the above procedures are followed at least for most of the operational lifetime of the battery pack, the lifetime of the battery pack can be extended as measured by the equivalent full discharge cycles calculated for the battery pack. This extension in lifetime then directly reduces the cost to store energy in the battery pack since the capital cost of the battery pack is typically 90% or more of the total cost (capital plus operating) of the battery pack.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

The following definitions are used herein:

A "battery cell" is an individual sealed or vented unit comprised of one or more internal plate assemblies, each plate assembly comprised of a negative plate, a separator material and a positive plate. The battery cell may have one or more external negative and positive terminals.

A "plate pair" is the basic unit of a cell and is comprised of a negative plate, a separator material and a positive plate. When the separator is impregnated with an appropriate electrolyte, a voltage typical of the particular battery chemistry is developed between the positive and negative plates. In a lead-acid battery, this voltage is typically about 2.13 volts at full charge.

A "battery rack" is a mechanical structure in which battery cells are mounted.

A "battery module" is a collection of cells mounted in a battery rack frame assembly of convenient size.

A "battery pack" is an assembly of many individual battery cells connected electrically. The assembly may be comprised of subassemblies or modules comprised of individual battery cells. The battery pack usually, but not always, has one overall positive and negative terminals for charging and discharging the cells in the pack.

"Float service" as applied to a battery means operating the battery under rigid voltage conditions to overcome self-discharge reactions while minimizing overcharge and corrosion of the cell's positive grid.

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

Figure 1:
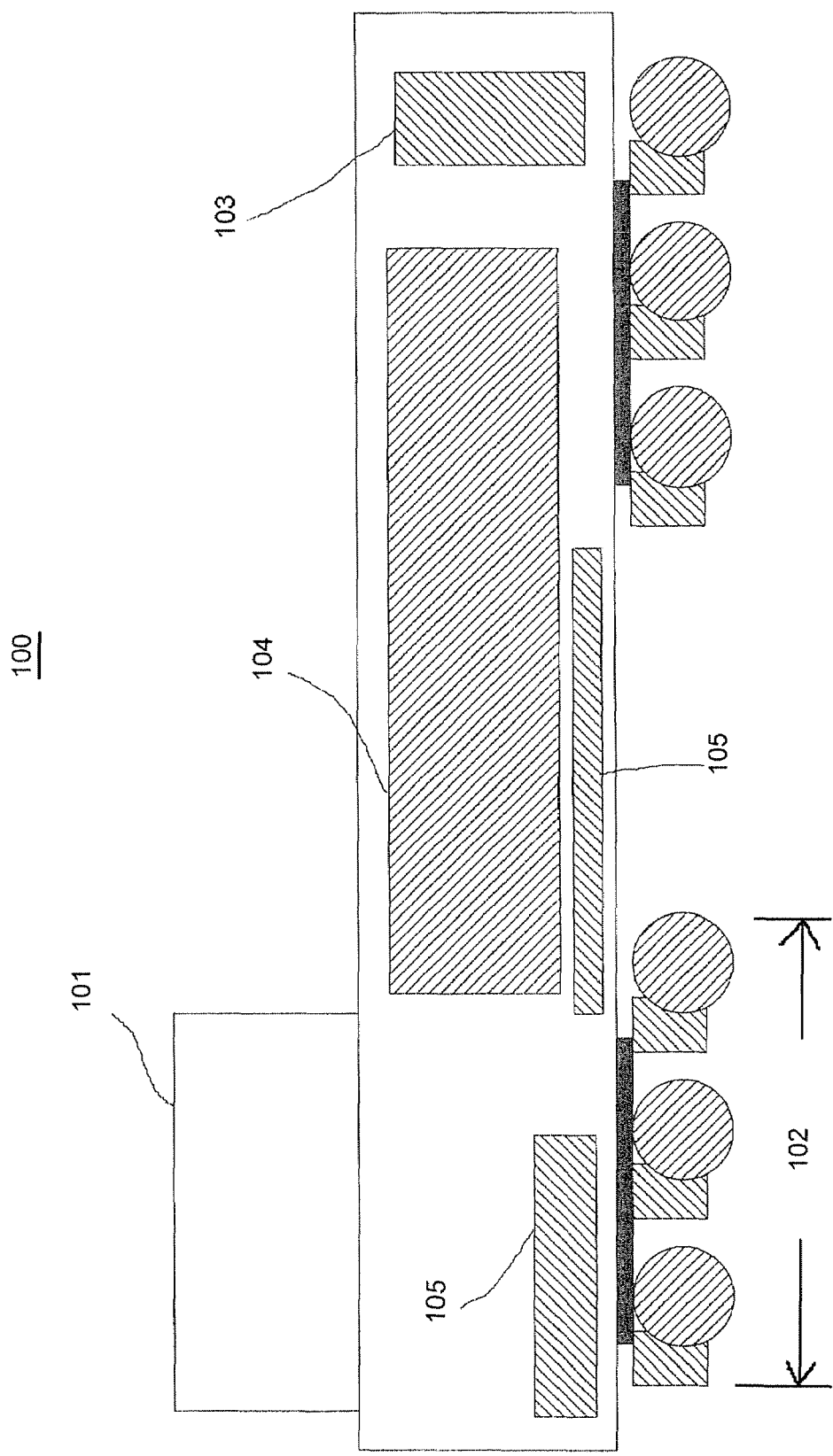
FIG. 1 is a schematic side view of a prior art assembly of a battery pack, generator and ballast installed on a locomotive frame.

The energy storage capacity of a battery cell can be characterized by its ampere-hour rating. The lifetime of the battery cell can also be characterized by a number of ampere-hours throughput of expected service. For example, a lead-acid battery cell may have a capacity rating of 1,500 ampere-hours and a lifetime estimated at 1.5 million ampere-hours total throughput. The ratio of expected lifetime to storage capacity is therefore equivalent to the number of cycles of full discharges that the battery cell can deliver over its lifetime. In the example above, this would be 1,000 full discharge cycles. This does not necessarily mean the battery cell can actually be fully discharged 1,000 times but it is a means to characterize the lifetime of the battery cell under the operating conditions recommended to achieve its specified lifetime. This method of estimating lifetime for a battery is appropriate to batteries that are continually discharged and recharged (cycled) during service, where the discharging and recharging may be held within a predetermined range that need not include full discharging and recharging. This can be contrasted to float service where the battery is operated under rigid voltage conditions which usually result in a lifetime measured in years of operation rather than in equivalent full discharge cycles.

An objective of hybrid locomotive design is to operate the locomotive in such a way as to maximize the lifetime of its energy storage unit. This is because the cost structure of an energy storage unit, such as for example a battery pack or capacitor bank, is primarily one of capital cost and secondarily of operating costs. It is known, for example, that operating a lead-acid battery pack generally within a predetermined range of state-of-charge ("SOC") range (preferably between about 20% to about 95% and more preferably between about 50% and about 95%), as well as applying known charging algorithms and procedures, tends to extend serviceable lifetime towards that of float service.

In addition to operating the battery pack as described above, it is important to maintain all individual battery cells under nearly identical conditions, such as operating temperature for example, so that individual cells can age at approximately the same rate by minimizing the number of equalization charges that are required. When individual battery cells are exposed to substantially different environments, they may diverge in performance because of, for example, different reaction rates on the plates as a result of differing operating temperatures. The corrosion rates observed on battery plates are known to be temperature dependent so maintaining individual battery cells in a battery pack at approximately the same temperature reduces the uneven buildup of corrosion on the battery cell plates thereby extending the useful lifetime of the battery pack as a whole. From time to time, these diverging cells can be brought back into rough balance by applying one or more equalization charges. A large number of equalization charges is known to reduce the lifetime of all the battery cells. This has always been a problem in large battery packs since the battery cells in the interior of the battery pack are usually much more thermally insulated than cells on the outside of the battery pack and therefore tend to operate at a higher temperature than cells on the outside of the battery pack. The present invention can overcome this thermal variation amongst individual cells. When coupled with the practice of operating the battery pack in a predetermined SOC range, the operating lifetime of the battery pack can be extended further.

In order to be cost-effective for application to rail and other transportation hybrid systems, an energy storage unit must be:

- packaged to conform to vehicle load and weight distribution requirements
- readily serviceable, especially for replacement of individual energy storage components
- capable of its desired energy storage capacity and power output performance
- able to withstand mechanical loads especially vibration and shock
- able to conform to various safety regulations especially with respect to overheating of battery cells that can lead to meltdown and/or fire
- able to contain a battery fire and prevent it from spreading
- able to operate in extreme ambient environments without serious effect on equipment lifetime.
- resistant to electrical ground faults by improved electrical isolation A large battery pack suitable for use in a hybrid locomotive typically consists of one or more modules of cells where all the cells are typically connected electrically in series. One or more modules may be connected electrically in series or electrically in parallel. In the embodiment described herein, all the cells are connected electrically in series so that the voltage across the battery pack is the sum of the individual voltages across the cells while the current output of the pack is the same as the current through each of the cells.

The following is a description of a hybrid locomotive battery pack design that utilizes a free convection cooling system supplemented from time to time by an auxiliary forced air convection system to provide cooling for battery cells. The rack used to house the cells is designed to: provide a structural housing for the cells of the pack; provide shock and vibration mitigation for the cells; provide electrical isolation of the cells from one another; allow relatively straightforward access for inspection, maintenance and cell replacement; to have provision for a battery monitoring system; and provide a means of fire containment through isolation of small numbers of battery cells in the event that one or more cells begins to degrade or fail. This latter is an important consideration since a large battery pack can be comprised of about 50 to 500 large battery cells electrically connected in series. As can be appreciated, when all the cells are connected electrically in series, the current through each cell is the same as the output current of the battery pack, so a degrading or failed cell can rapidly become a thermal energy hotspot that can cause locomotive shut down or lead to a cell meltdown and potential battery pack fire.

FIG. 1 is a schematic side view of a battery pack, engine and ballast installed on a locomotive deck. The hybrid locomotive 100 has an operator's cab 101. Alternatively, this arrangement of engines, batteries and ballast may be used on a cabless hybrid locomotive. The engines 103 are typically located near the front of the hybrid locomotive 100 but, as can be appreciated, may be located elsewhere on the locomotive deck. The battery pack 104 typically occupies the largest volume in the hybrid locomotive 100 and usually represents the greatest weight component in the power pack. The battery 104 is therefore usually placed near the center of the locomotive frame to best distribute weight over each truck assembly 102. Often, the weight of the battery pack 104 is not sufficient to provide the required locomotive weight for best traction and so ballast 105 may be added. The ballast 105 may be placed to even out the weight distribution over the truck assemblies 102. The ballast 105 may be comprised of inert weight such as for example lead blocks or it may comprised of useful weight such as for example spare battery cells. A battery pack for a large hybrid locomotive may weigh as much as about 50,000 kg. Typically, a large battery pack is comprised of a least one module. The total weight of the module is preferably in the range of 1,500 kg to 25,000 kg. Each module must be able to be removed by means such as for example an overhead crane, a forklift or a mobile crane. The weight distribution of the battery pack when installed on a locomotive frame is such that the distribution of weight of the battery pack on each axle of the locomotive is preferably in the range of about 15,000 kg to 30,000 kg. The need for additional ballast to be added to balance the weight distribution of the battery pack on the locomotive, the weight of ballast being no more than about 50% of the weight of the battery pack. The weight distribution of the battery pack and the additional ballast is sufficient to permit a tractive effort per driving axle in the range of 0 to about 20,000 lbs force to be achieved for a rail adhesion coefficient of about 18% or greater.

A large battery pack commonly includes at least one module. A module is typically comprised of at least 12 rows, more typically 21 to 30 rows, and can be comprised of as many as 60 rows. A row commonly contains from 2 to about 6 cells, depending on the size and weight of the individual cells. The weight of a large energy storage cell is typically in the range of about 50 to about 120 kg so a row of cells is typically in the range of about 150 kg to about 500 kg. A cell must be able to be removed by means such as for example an overhead crane, a forklift, a mobile crane or manually by including lifting handles on the battery cells. Each row of cells must be able to be removed by means such as for example an overhead crane, a forklift or a mobile crane. A typical battery pack may be comprised of two modules. The size of the battery pack can be made larger by adding additional modules.

An important component of a preferred embodiment of the present invention is a row in which a relatively small number of battery cells are housed. The number of cells housed in an individual row are preferably between 2 and 10 and more preferably between 3 and 5 cells. Expressed alternately, the energy storage capacity of the cells housed in an individual row is preferably between approximately 2,000 and 20,000 kW-hours, where the capacity is based on a 10 hour discharge time.

The battery rack is preferably made from a high strength, high heat conducting metal such as for example a steel alloy, an aluminum alloy and the like. This type of material is preferred because it provides mechanical strength which is retained if the batteries contained within overheat and melt down. It also provides high heat carrying capacity to help carry away and distribute heat throughout the battery pack if the batteries inside overheat and meltdown.

The battery rack which holds all the cells of the pack may be mounted using shock and vibration resistant spacers which maintains the rack within a small controlled distance relative to its desired position while mitigating any mechanical vibration and shock loading experienced by the battery pack as a whole. The spacers also function to provide electrical isolation of battery pack as will be discussed below. The battery pack and its components are preferably capable of normal operation under longitudinal or vertical shock loading of no less than 2 times the acceleration due to gravity (2 gs). Individual cells are preferably able to withstand shock loading of no less than 2 gs and a constant vibration loading of no less than 0.00003-m deflection at 100 cycles per sec and 0.03-m deflection at 1 cps, and in between being approximately linear on a log-log plot.

It is preferable to design a battery pack having a life expectancy expressed as a number of equivalent full discharge cycles greater than about 500, more preferably a number of equivalent full discharge cycles greater than about 1,000 and most preferably a number of equivalent full discharge cycles greater than about 1,500. It is also preferred to design a battery pack having a period between routine servicing expressed as a number of equivalent full discharge cycles greater than about 100 and more preferably greater than about 500.

Figure 2:
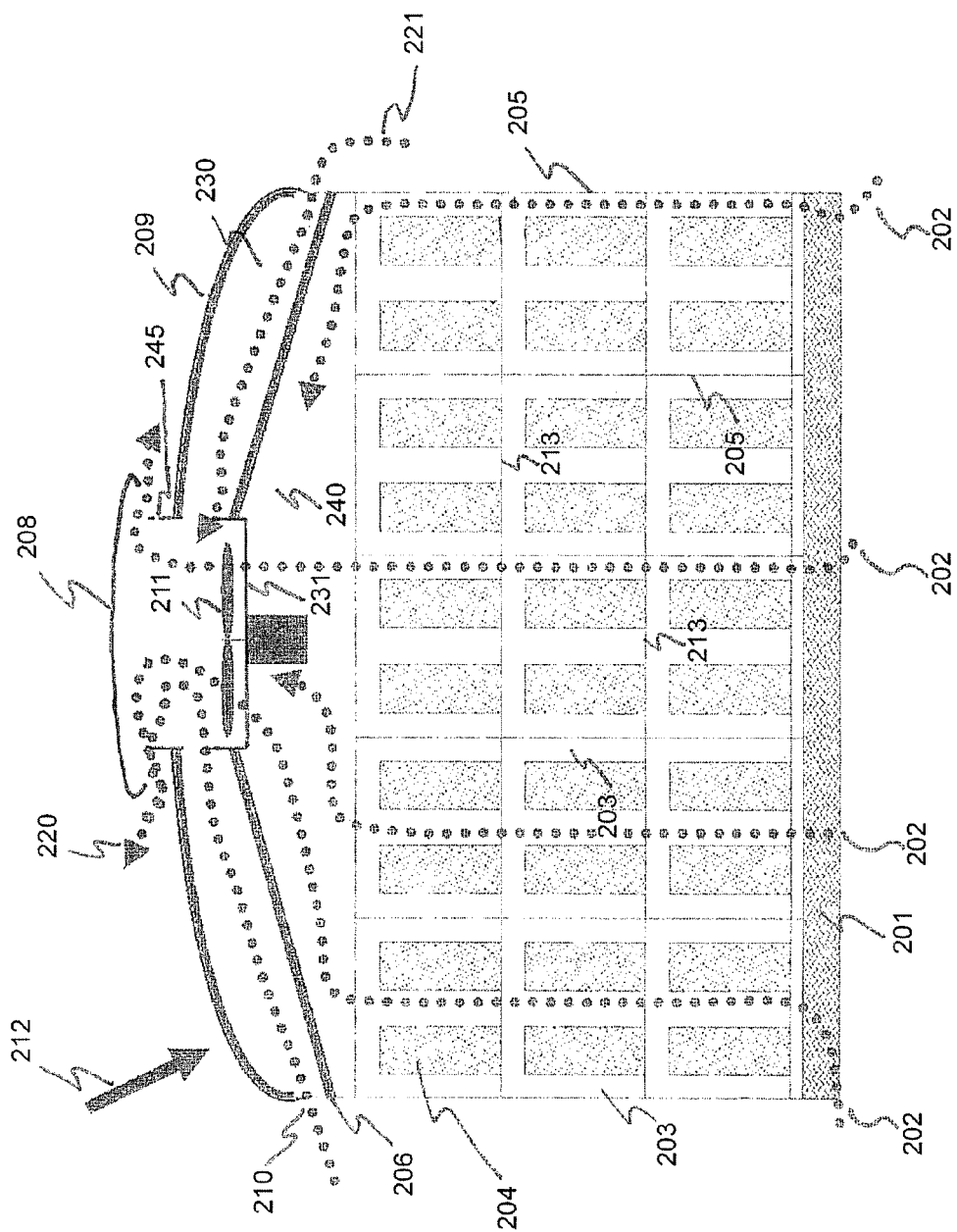
FIG. 2 is a schematic illustrating the key elements of a free convection, thermally controlled battery rack of the present invention.

In the present invention, a large energy storage battery pack is described which includes a number of key design areas. These are:
thermal management
fire containment and mitigation
shock and vibration control
structural soundness
battery pack and cell monitoring system
electrical ground fault protection
maintenance and servicing FIG. 2 is a schematic illustrating the key elements of a preferred embodiment of a free convection, thermally controlled battery rack concept. The design embodies combination of natural convection and forced convection features that minimizes the need for forced convection. That is augmentation by the forced convection means is used only from time to time under severe operating or environmental conditions. This strategy reduces the amount of auxiliary electrical power needed to keep the battery pack cooled. The hood assembly design and placement were derived with the assistance of a numerical simulation of air being convected past the cells and upwards into a lower plenum contained between the top of the battery pack and a protective hood. A fan 211 is shown at the apex of the lower plenum 240. The fan 211, when operating, forces air out of the lower plenum 240 thereby augmenting the free convection cooling system with forced convection when needed. The fan 211 may be a fixed speed or variable speed fan. A variable speed fan can be used to further control and reduce the power required to cool the batteries especially under moderate climate conditions and/or moderate average current draw by the battery pack. FIG. 2 further shows a battery pack hood detail illustrating a radiation barrier 209. When a solar load 212 heats the hood 209, the air between the hood 209 and upper plenum 230 will naturally convect from the soffit opening 210. The air will also provide an additional insulating layer between the warm hood 209 and the insulated wall 206 separating the upper and lower plenums, 230 and 240 respectively. All these features will minimize the solar heating from the hood to the battery cells.

The natural convection features include a corrugated, perforated metal inlet louver 201 at the base of the rack. This allows a greater than 100% projected area opening for minimizing flow loss while maintaining structural and filtering requirements. The air enters through the base louvers and flows as indicated by dotted paths 202 along the rack base and enters natural convection gaps 203 between the stacked battery cells 204. Vertical solid wall plates 205 are used to provide fire walls and provide vertical flow barriers for the convecting air. The battery cells 204 act as approximately constant heat flux sources and are oriented in the rack so the largest surface area sides (preferably the sides where the cell plates are aligned perpendicular to the exposed sides) are exposed to the natural convection air gaps 203. The air flows vertically up into a lower plenum 240 that guides the air to the fan duct 231 which provides a chimney effect. The chimney vent 245 has a cap 208 that prevents rain and debris from entering chimney vent 245 and duct 231.

Another important natural convection feature is the section between the upper plenum 230 and the hood 209. A louvered soffit 210 is used on the side of the hood 209 to allow air flow as indicated by dotted path 221 to enter this cavity and naturally convect to the fan duct 231 and enter the chimney vent 245 via slots that are cut into the vent wall. These slots are located vertically above the fan plane so when the fan 211 is running it will not draw air from this cavity but pull air from the lower plenum 240 below which the battery cells 204 are contained. These overall features provides a means for minimizing the solar radiation heat source 212 that is created by the solar load on the outer hood 209 surface. The hood 209 outer surface is preferably painted with a high reflectivity paint. The hood 209 inner surface is preferably thermally insulated. The wall 206 separating the upper and lower plenums, 230 and 240 respectively is also preferably thermally insulated. When the solar load heats the hood 209, the air between the hood 209 and upper plenum 230 will naturally convect from the soffit opening 210 and out the duct slots and subsequently out the chimney vent 245 as shown by air flow 220. The air will also provide an additional insulating layer between the warm hood 209 and the upper plenum 230. All these features will minimize the solar heating from the hood 209 to the battery cells 204.

A similar concept may be used for the sides of the hood which are typically the battery hood doors. The doors are preferably double walled with the same insulation features described for the hood 209 and wall 206. The bottom and tops of the double paneled doors may have air flow slots that allow the air to naturally convect vertically between the door walls. The top slots may open into the lower plenum 240. By opening into the lower plenum 240, the door interiors will be protected from rain, snow, dust and other debris. They will also have the benefit of the forced air convection created by the fans 211 when the fans 211 are running.

The air gaps 203 between the cells are sized to optimize the natural convection cooling for the approximately constant heat output of the cells 204. Where two adjacent battery cells 204 do not have a vertical fire wall 205 and they both provide heat to the gap 203, this gap is specified to be moderately larger than the gap 203 that is needed between a cell 204 and a fire wall 205. These gaps 203 should be sized in the range of approximately 15 mm to about 30 mm range for the smaller gaps with the larger gaps being about 1.2 to 1.3 times the width of smaller gaps for optimum natural convection cooling. Gaps 203 that are too large will result in natural convection re-circulation.

Horizontal fire walls 213 are slotted to match the air gaps between the battery cells while maintaining some fire wall capability. During extreme temperature conditions, a fan 211 is activated and air is forced through the air gaps. The fan 211 is sized to provide sufficient velocity to keep the battery cells 204 cool and within the preferred temperature variance under these extreme conditions. As can be appreciated one large fan or several smaller fans may be used. Testing on a 24 cell battery rack has shown that both the natural convection and forced convection systems work as designed.

The natural convection system described above may be made more efficient by integrating into or onto the battery cell surfaces enhanced area features such as fins, pins, slots, dimples, and so on. These will act to increase the heat transfer coefficient between the cell walls and the air flow past them.

Figure 3:
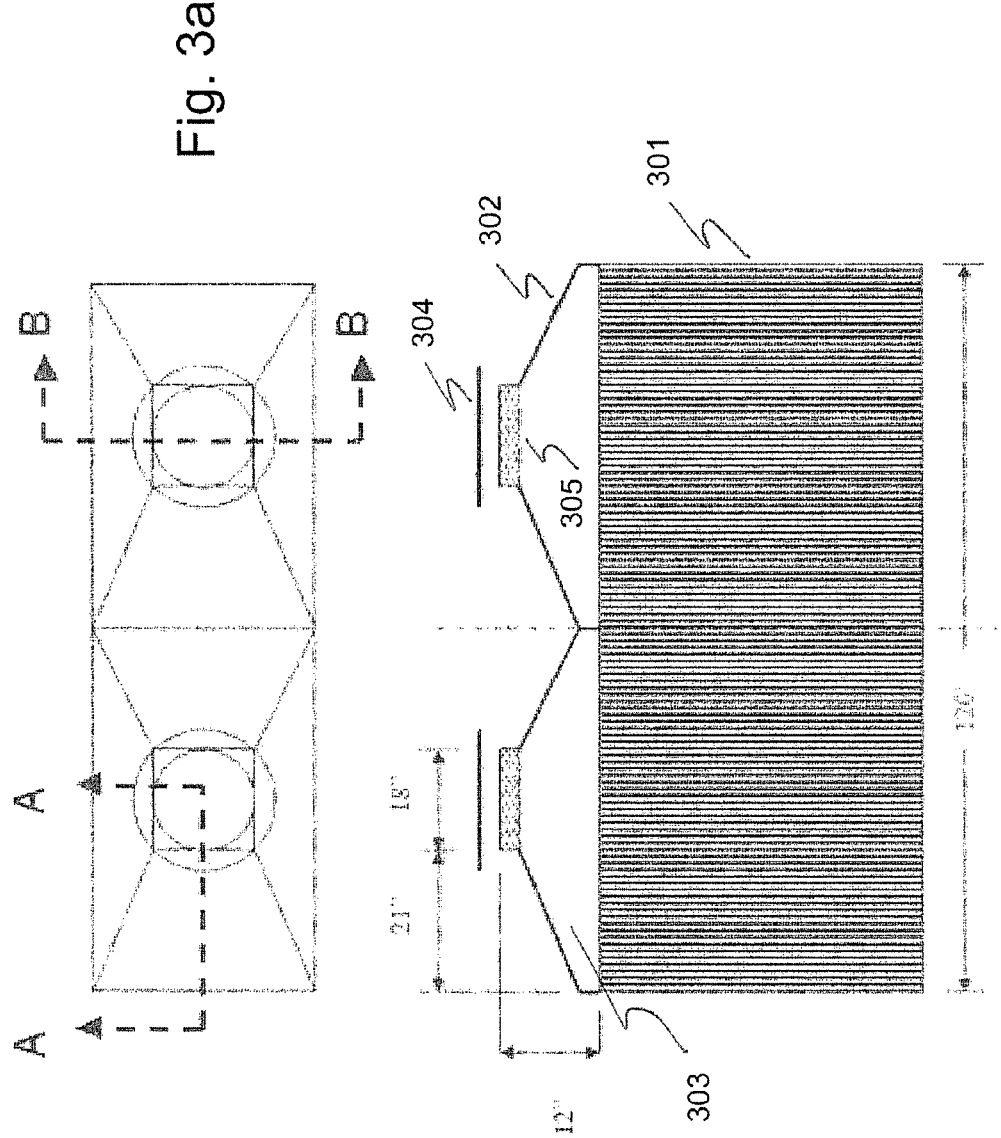
FIG. 3 shows plan and side views of a battery pack hood of the present invention.

FIG. 3 shows plan and side views of a battery pack hood of the present invention. FIG. 3a shows a plan view. FIG. 3b shows a side view with battery pack 301 and illustrates two lower plenums 303 topped by angled ducts 302. Fan shrouds 305 are shown protected by chimney caps 304. The dimensions shown in FIG. 3b are typical for a large battery pack suitable for a hybrid locomotive.

Fire Containment and Mitigation

The free convection system allows for a passive fire-suppression and fire containment strategy wherein any anomalous heating event (including a battery cell fire) is confined to a small number of cells, typically from about two to about six cells. The use of horizontal and vertical fire walls provides a containment system that is also part of the battery rack structural system. If an anomalous heating event or cell fire is detected by a battery monitoring system, then the forced air cooling fan or fans are typically turned off. A number of cells in a row constitute a containment section which is bounded by horizontal fire walls on top and bottom and by vertical fire walls on each side. Because the rack utilizes free convection, heat or flames can propagate upwards through the free convection channels. Thus a containment zone is considered to be comprised of all the rows of cells in a column. This containment zone is bounded by vertical fire walls on each side and by horizontal fire walls at the top of the top row and at the bottom of the bottom row. The free convection channels may be shut off utilizing a fusible slot damper at each horizontal fire wall which may be activated (closed) when the battery monitoring system detects an anomalous heating event or cell fire.

Figure 4:
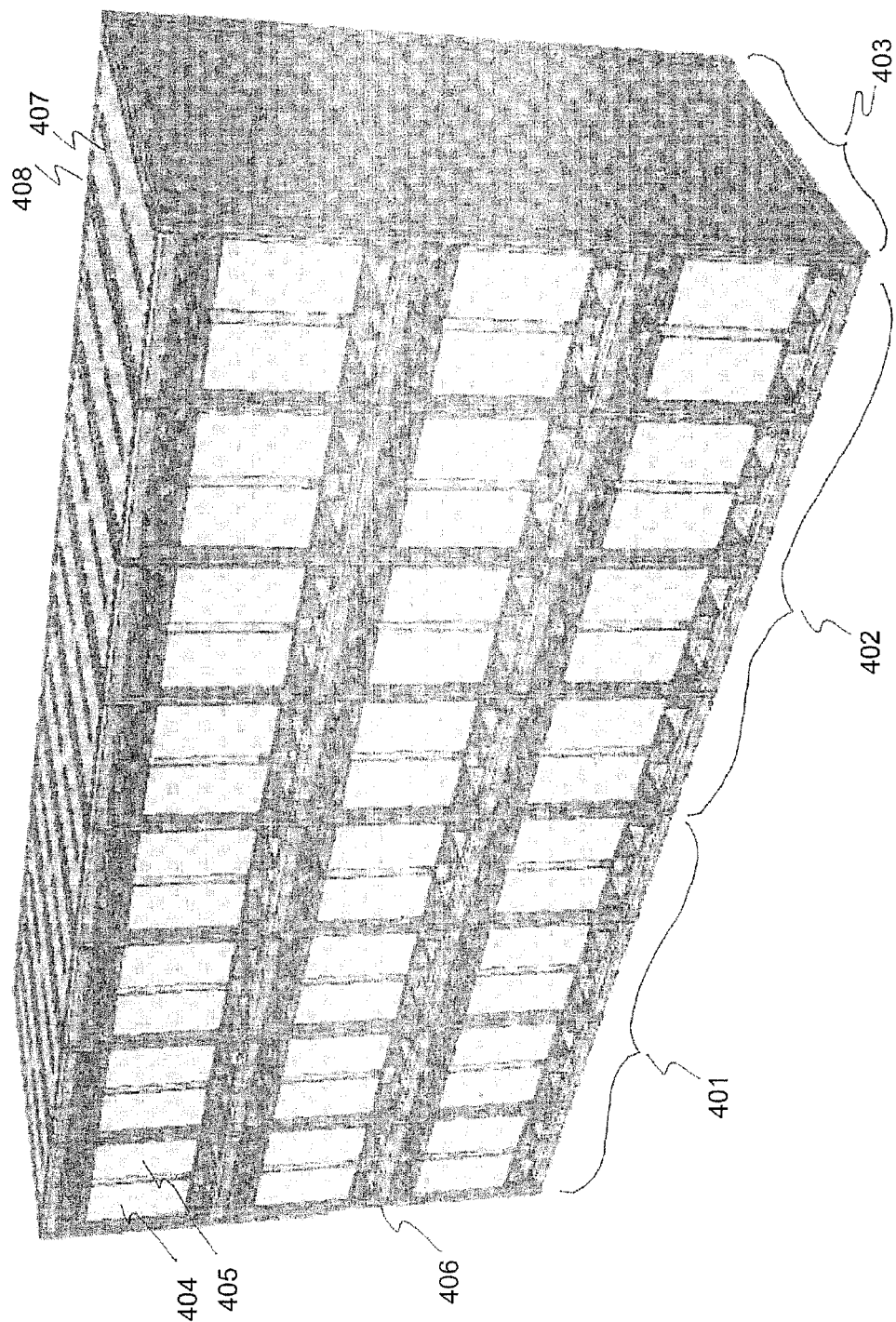
FIG. 4 is an isometric view of a large HEV battery pack.

FIG. 4 is an isometric view of a large HEV battery pack 400. In this example, the battery pack 400 is comprised of two modules 401 and 402 joined together. The battery rack contains 48 rows of cells. Every 2 rows of cells are separated by vertical fire walls 408. The rack is divided horizontally by horizontal fire walls 406. In this example, two cells 404 and 405 are shown between each vertical fire wall 407. Also shown, are slots 408 in the top horizontal fire wall through which air flows vertically up into a lower plenum (shown in FIG. 2). When the rack width 403 is designed to fit on the deck of a locomotive, it is typically wide enough for 3 or 4 large energy storage cells.

Figure 5:
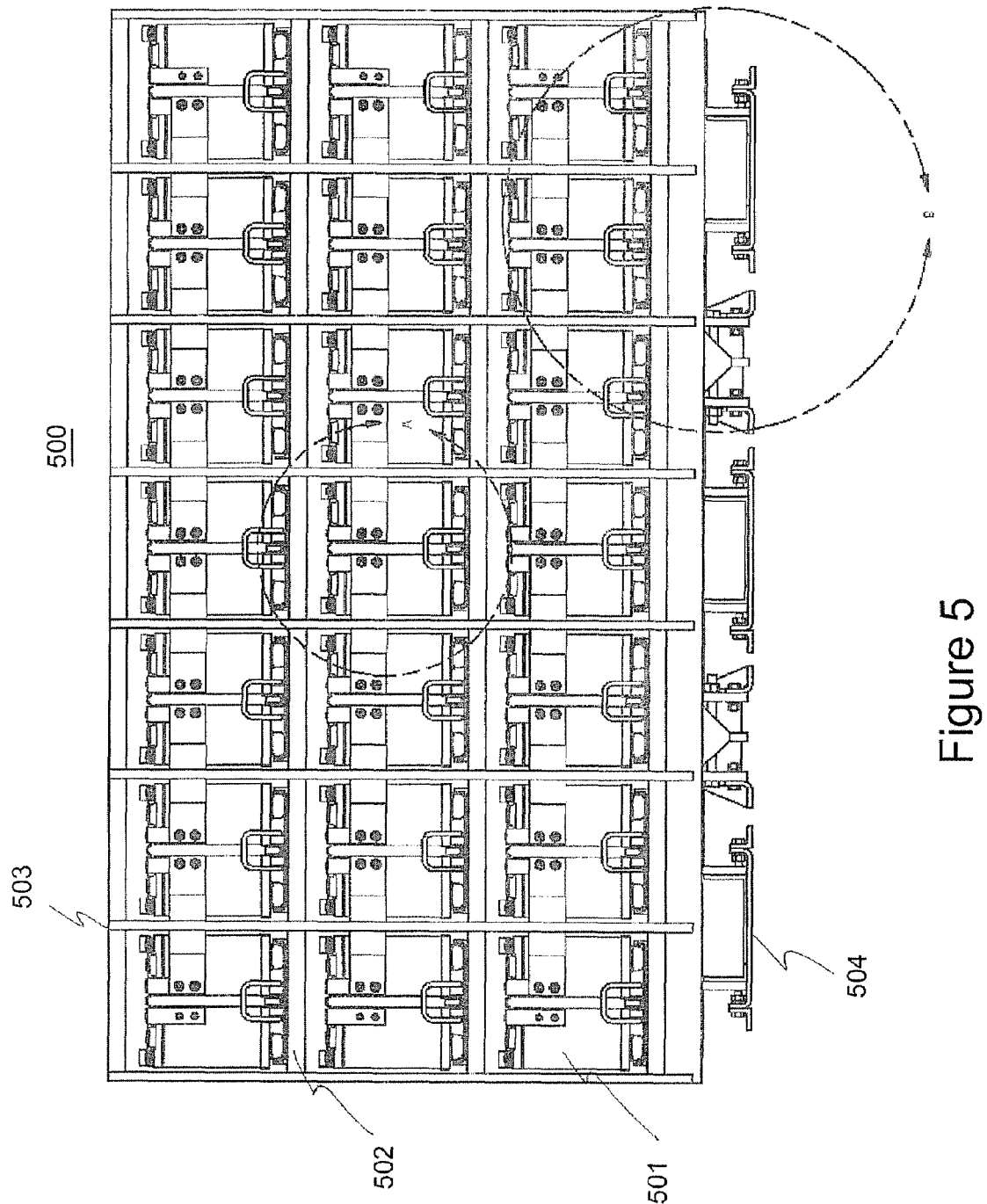
FIG. 5 is a side view of a two module battery pack.

FIG. 5 is a side view of a two module battery pack 500. This example illustrates a general layout for a free convection system, showing horizontal fire walls 502 and vertical fire walls 503. In this view, 2 rows of cells 501 are shown within top, bottom and side fire walls. As noted previously, there may be two or more cells in a row at each cell location shown in this view. A typical deck mounting system 504 is also shown.

Figure 6:
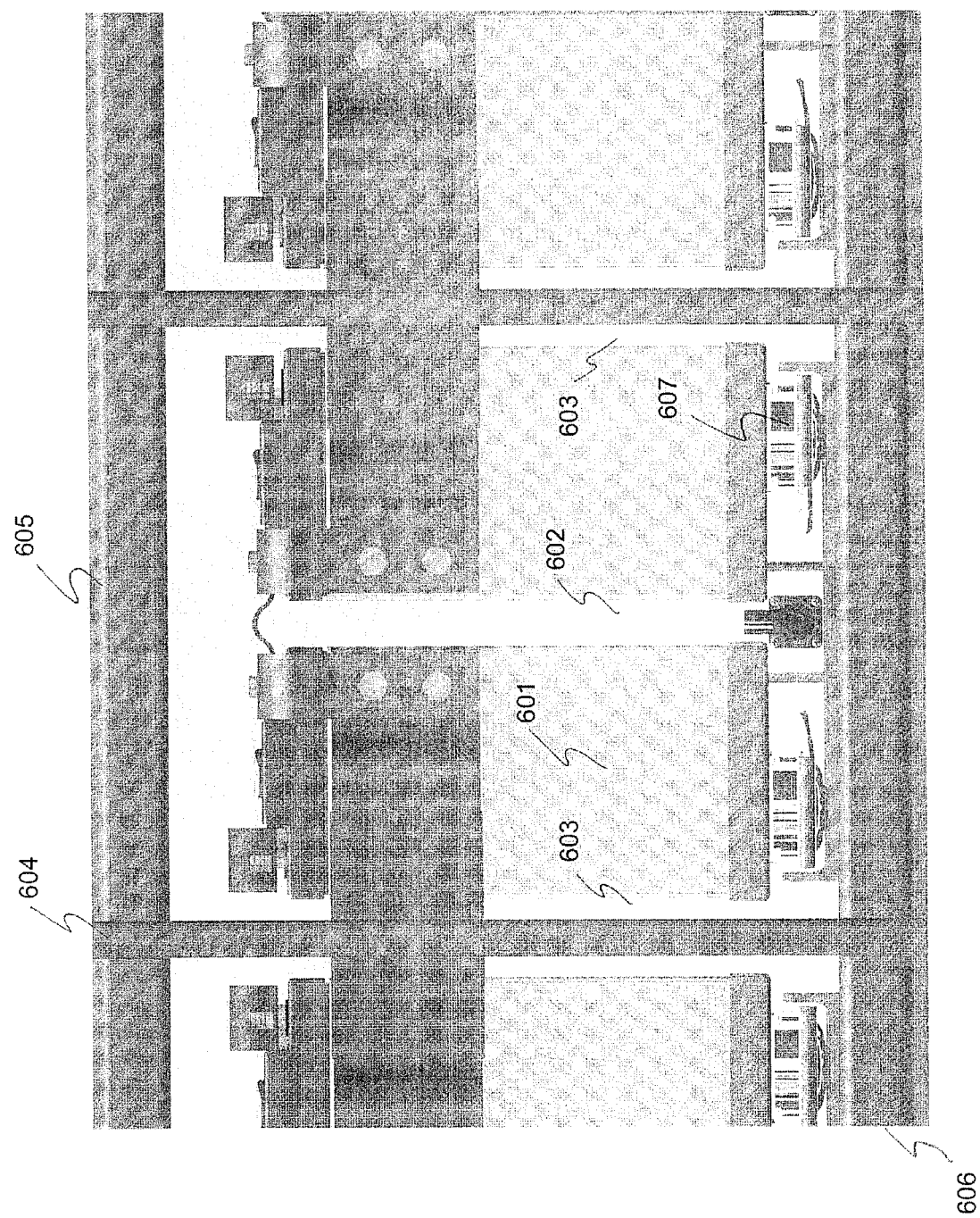
FIG. 6 is a close up view of cells in a rack.

FIG. 6 is a close up view of cells in a rack. This example further illustrates cells 601 within top 605, bottom 606 and side 604 fire walls. This example further illustrates cells 601 with center free convection vertical channels 602 and side free convection vertical channels 603. The cells 601 are shown on trays which are preferably made of plastic. This approach can save cost, weight, and most importantly provides a non-conducting reservoir to collect any leaking battery acid to further prevent unintended shorts or ground faults which can lead to, for example, initiation of a cell meltdown or fire initiation. In FIG. 6, these trays are shown having rollers 607 attached or built into the trays for ease of service and maintainability.

Thermal Management

A principal design objective of the battery pack of the present invention is to maintain all the cells in the pack within a narrow temperature range, typically temperature variation amongst all cells in the pack of no more than about 5° C. and preferably no more than about 3° C. The design objective is important because the cells are typically electrically connected in series and maintaining uniformity of cell temperature helps to equalize the rate of deterioration of active negative plate and positive plate material so that each cell has approximately the same lifetime as measured by ampere-hour throughput. A free convection cooling system (augmented during high power charging or discharging periods by some forced convection cooling) minimizes the parasitic power required for cooling by requiring only a small number of large circulation fans. The forced convection system (comprised typically of air fans for supplemental cooling during more demanding portions of the duty cycle and/or while operating in severe environmental conditions) may also be required to help control the absolute temperature of all the cells in the pack. For example, on hot days, the forced convection portion of the system can be used to increase the flow of cooler air past the cells to reduce overall pack temperature and maintain the temperature of the pack below about 50° C. On cold days, the forced convection portion of the system can be operated to re-circulate warm air from the engines, a heater and/or the heat generated by the cells themselves to increase the flow of warmer air past the cells to increase overall pack temperature to a more preferable range, typically above about 0° C.

The operation of the system is preferably managed by a battery monitoring system that includes temperature monitors located at numerous locations within the pack (up to and including monitors on every cell). As one of its functions, this monitoring system can be used to control the operation of the forced convection portion of the system as needed.

The free convection system was designed using well-known free convection heat transfer analyses. The forced convection system was designed using well-known forced convection heat transfer analyses. The parameters used in the analysis were established by measuring cell temperatures under expected operating conditions. Heat transfer coefficients were estimated using the known material properties of materials typically used in the construction of the cells and rack components.

Figure 7:
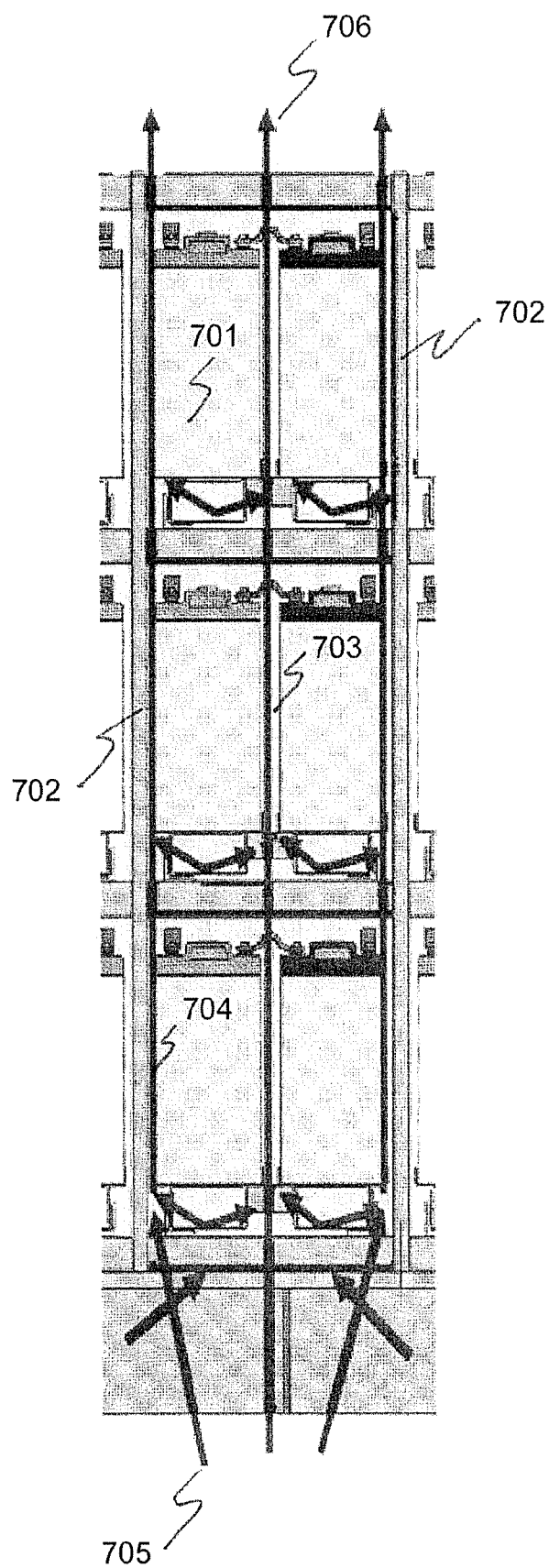
FIG. 7 shows the general direction of free convection air flow.

FIG. 7 shows the general direction of free convection air flow for a typical free convection battery pack system of the present invention. This figure shows a portion of a battery cell rack containing 6 cells 701 bounded by fire walls 702. The air-flow gap 704 between cells 701 and fire walls 702 is smaller than the air-flow gap 703 between adjacent cells 701. The gap 704 between the cell wall and a vertical fire wall is sized to remove heat from a single side of a row of cells. The gap on the 703 between the cell wall and an adjacent cell wall wider because it must remove heat from a both sides of a row of cells. The width of gap 704 is in the range of about 15 mm to about 30 mm which is appropriate for large energy storage cells used on large hybrid vehicles which typically have a thermal heat output in the range of about 15 to 30 watts per cell over an average duty cycle. The width of gap 703 is in the range of about 1.2 to 1.3 times the width of gap 704.

The thermal output of the cells in a large battery pack is a result of $I^2R$ losses occurring inside the cells of the pack. The level of current typical of an average current generated in a hybrid locomotive yard switching application is in the range of about 250 to about 500 amperes, with peak currents as high as about 1,500 amperes. Numerical simulations of a free convection air cooling system show that a free convection air cooling system for the cells is sufficient for most operational yard switcher and road switcher duty cycles.

Other numerical simulations of a forced convection air cooling system, such as might be used to augment the free convection system during times when the cells are being discharged at a higher than normal rate, show that a fully turbulent forced air cooling system of 7,000 cfm would be sufficient to maintain the required uniformity of cell temperature for a hybrid locomotive battery pack of approximately 300 to 350 cells where each cell typically has a storage capacity in the range of about 800 to about 1,500 ampere-hours.

Figure 8:
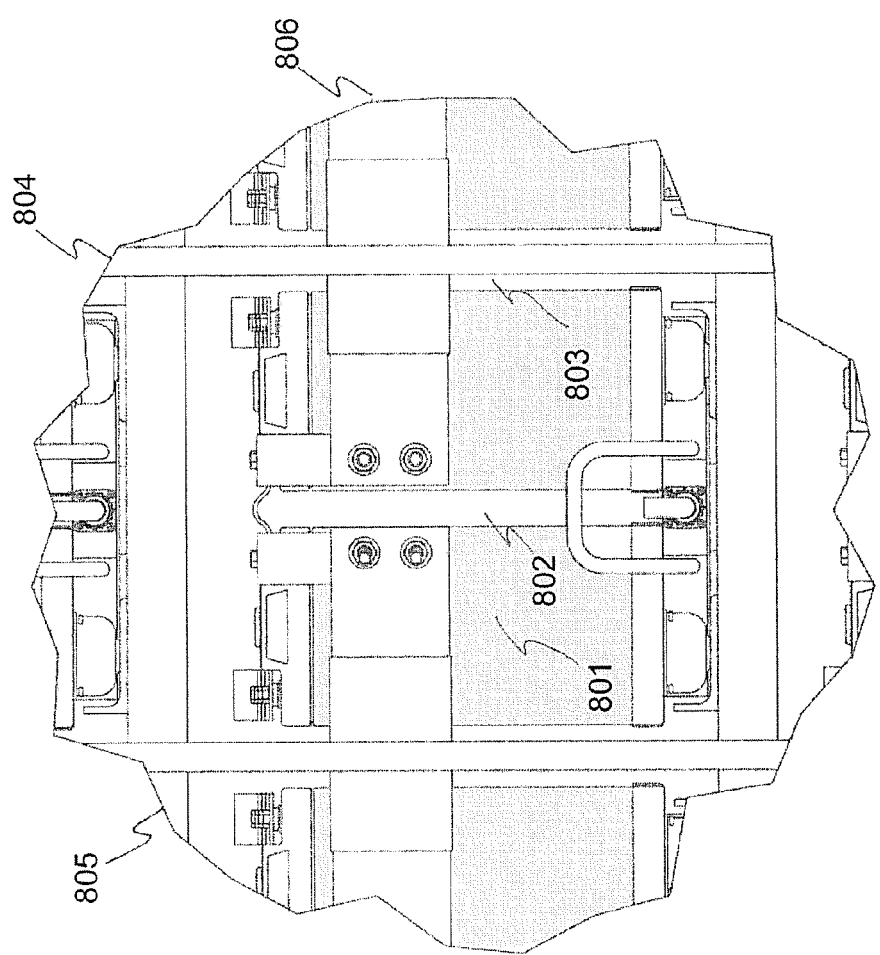
FIG. 8 shows a detail view of cells in a free convection system.

FIG. 8 shows a detail view of cells in a free convection system. This example further illustrates cells 801 and center free convection vertical channel 802 and side free convection vertical channel 803. A typical retaining strap 806 for maintaining the cells firmly in position is shown. A vertical fire wall/structural member 804 and a horizontal fire wall/structural member 805 are also shown.

Figure 9:
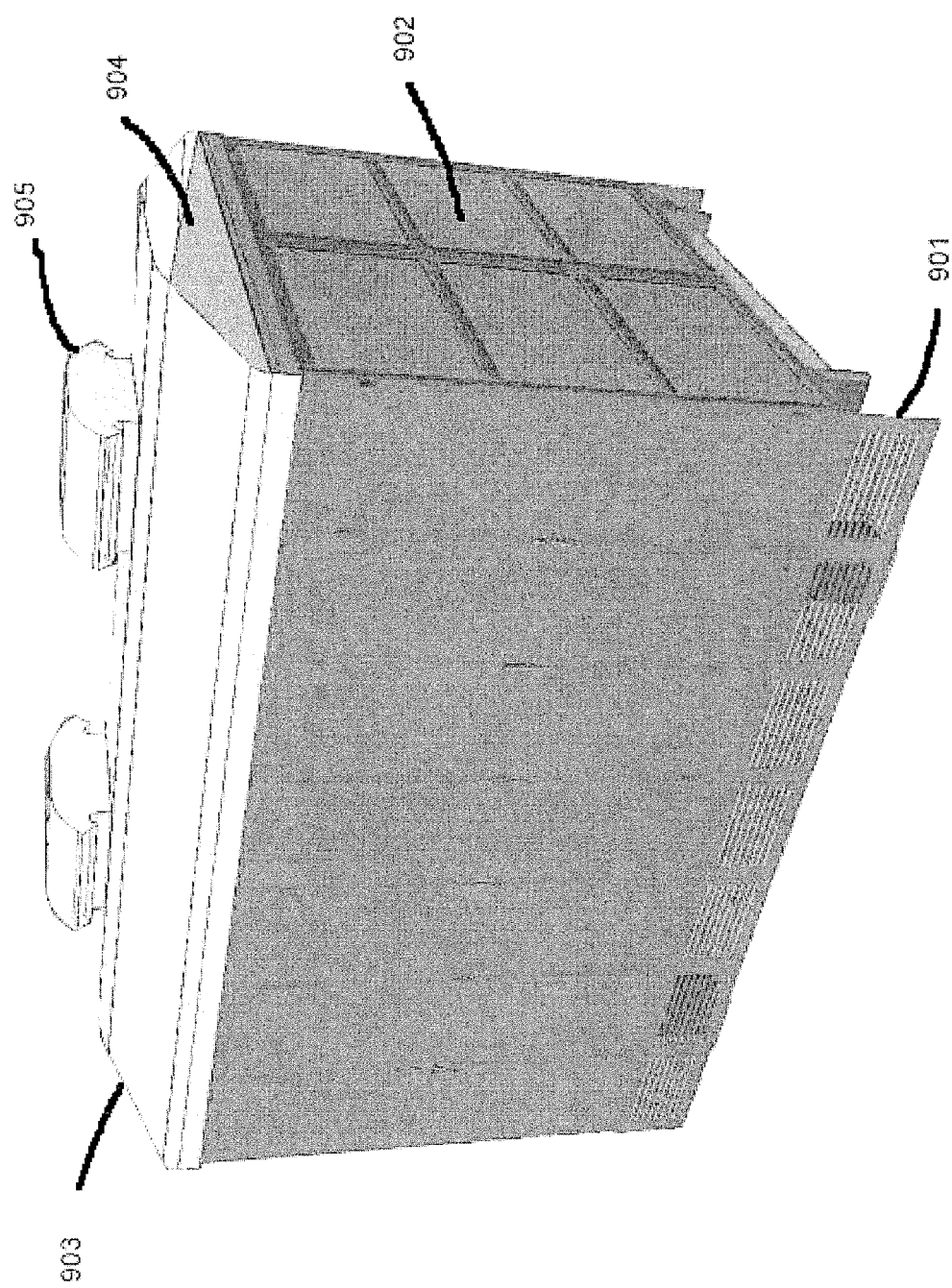
FIG. 9 is an isometric view of a hood assembly for a free convection battery pack.

FIG. 9 is an isometric view of a hood assembly for a free convection battery pack such as described previously in FIGS. 2 and 3. The hood assembly is comprised of sidewalls 901 and a top hood 903. The hood assembly covers the battery pack 902. Also shown is a lower plenum 904 which vents into the outside atmosphere via chimney cap 905. This hood assembly is shown in cross-section and explained in more detail in FIG. 2.

Shock and Vibration Control

Another principal design objective is to control the shock and vibration environment of the cells in the battery pack. This is necessary in order to prevent, for example, active material on the positive and negative cells plates from damage that could cause electrical shorting which, in turn, can lead to a cell fire. This type of damage would more likely substantially reduce cell lifetime by changing the internal electrical characteristics of cell plates, resulting in reduced capacity for the affected cells.

The shock and vibration design criteria cited below were derived from calculations and measurements of the mechanical environment of a yard switcher locomotive. For example, it is often the case that a yard switcher will impact a string of rail cars at speeds of about 1 to about 5 mph, resulting in an abrupt deceleration of approximately 5 gs or greater (1 g is the acceleration due to gravity). This impact generates a shock that must be mitigated before it propagates into the cells of the battery pack. The design goals of a shock mitigation system for a large battery pack for a battery dominant hybrid locomotive are typically for a response reduction of about a factor of 10 in peak acceleration (or deceleration) as seen by the cells compared to the acceleration (or deceleration) seen by the locomotive frame. Thus the shock mitigation system is designed to protect the cells in the battery pack from no more than:

about 0.3 gs in the longitudinal direction (direction of deceleration when impacting a string of rail cars as for example during yard assembly operations)

about 0.25 gs vertical acceleration about 0.1 g lateral acceleration

These design goals are for a shock mitigation system that must accommodate typically several thousand impacts.

The system must also be able to mitigate vibration generated for example by the locomotive traveling along the rails at speeds up to about 30 mph in the case of a yard switcher. The vibration suppression system is designed to protect the cells in the battery pack from no more than typically:

about 0.3 inches peak-to-peak in the frequency range of 1 to about 10,000 hertz.

The battery rack suspension system of the present invention has been designed based on expected shock and vibration requirements for a yard switcher hybrid locomotive. For example, shock isolation is based on the locomotive decelerating at 5 times the acceleration of gravity (5 Gs) from 5 mph to a complete stop such that the motion response of a large battery pack mounted on the deck of a locomotive is confined to displacements in the range of about ±30 mm during deceleration to rest. This system is also compatible with response of a large battery pack to vibrations in the range of approximately 1 to approximately 3 hertz using the marshmallow type mounts under the battery pack.

Electrical Ground Fault Protection

Another principal design objective is to create a ground fault system for the cells in the battery pack. As discussed previously, the cells in the pack are typically connected electrically in series so that the voltage across the battery pack is typically in the range of about 300 volts to about 1,200 volts. Therefore it is important that the cells be protected from unintended ground faults that might be caused, for example, by:

- cells venting small amounts of electrolyte which can lead to a conductive film on the cell case
- cell case cracking and leaking electrolyte, the cracking being caused by shock and vibration, very cold weather and/or by manufacturing defect
- improper installation and/or failure to properly secure a cell in the rack Since the entire rack is electrically isolated form the main locomotive ground by the shock and vibration isolation system discussed previously, one battery pack grounding strategy is to provide a ground strap from the electrical ground of the locomotive (typically the metal deck of the locomotive) to a point on the negative side of the battery pack. While the ground strap can be attached anywhere on the negative side, it is preferable to ground the battery pack at the midpoint of the series string of cells so that the maximum voltage differential to ground is half the total battery pack voltage. The grounding strap can also be used as source for measuring currents caused by short circuits or unintended ground faults caused by battery leakage such as described above. The battery pack can be grounded as a whole or each battery pack module can be grounded individually.

Individual cells may be isolated from the rack structure by placing the cells on a thin non-conductive plate such as for example a thin sheet of plastic such as nylon, polyethylene, mylar or the like. Another method is to place cells on plastic battery trays. This approach can save cost, weight, and most importantly provides a non-conducting reservoir to collect any leaking battery acid to further prevent unintended shorts or ground faults which can lead to, for example, initiation of a cell meltdown or fire initiation. Further, these trays can have rollers attached or built into the trays for ease of service and maintainability.

In addition, provisions must be made to avoid the rack or cells from contacting the sides of the hood during operation, especially deceleration during yard switching operations. This can be done by providing space for sway and providing non-conductive stops (hard rubber bumpers for example) for sway beyond normal operating conditions.

Battery Pack and Cell Monitoring System

A monitoring system is preferably required to monitor the temperatures, voltages and state-of-charge ("SOC") of cells or groups of cells in the pack. The monitoring system is also preferably required to monitor current and state-of-charge ("SOC") of the pack (as has been noted, the cells are typically electrically connected in series so the current is common to all cells and can be used to compute the SOC). Temperatures may be monitored by any number of well known sensors such as for example, thermocouples, thermal resistors and the like. Voltages may be monitored by any number of well known sensors such as for example, voltmeters, viewing resistors and the like. The current through the pack may be monitored by any number of well-known current sensors. The current is the same through each cell (unless a cell of group of cells is electrically by-passed by a shunt). The SOC of the cells may be determined by their open circuit voltage or by accounting for its current input/output history.

The monitoring system is typically managed automatically by a controller which can be configured to continuously or intermittently display data to the engineer in the locomotive cab or to activate warning devices if any parameter is detected out of its normal operating range.

Structural Soundness

The structural elements of a battery rack suitable for a battery-dominant hybrid locomotive (or locomotive with a smaller battery pack but still capable of providing substantial additional power and energy storage capacity for the propulsion system) must be capable of performing:

- mechanical functions (containment of the cells even in a derailment situation, ease of maintenance, couple to the shock and vibration mitigation system)
- thermal functions such as providing air flow channels
- electrical functions such as ground fault protection and power cable routing
- other functions such as protection from the elements such as rain, snow and dust.

The rack structure must also be lightweight, typically no more than about 50% of the weight of the cells it contains and preferably no more than about 20% of the weight of the cells it contains. For example, a rack assembly might weigh about 6,000 kg and contain about 15,000 kg of cells for a total assembled battery pack weight of about 21,000 kg. In addition the rack must fit on the deck of a locomotive with enough room for walkways on either side. The height of the rack assembly should allow for good visibility especially if the operator's cab is at the rear of the locomotive.

Figure 10:
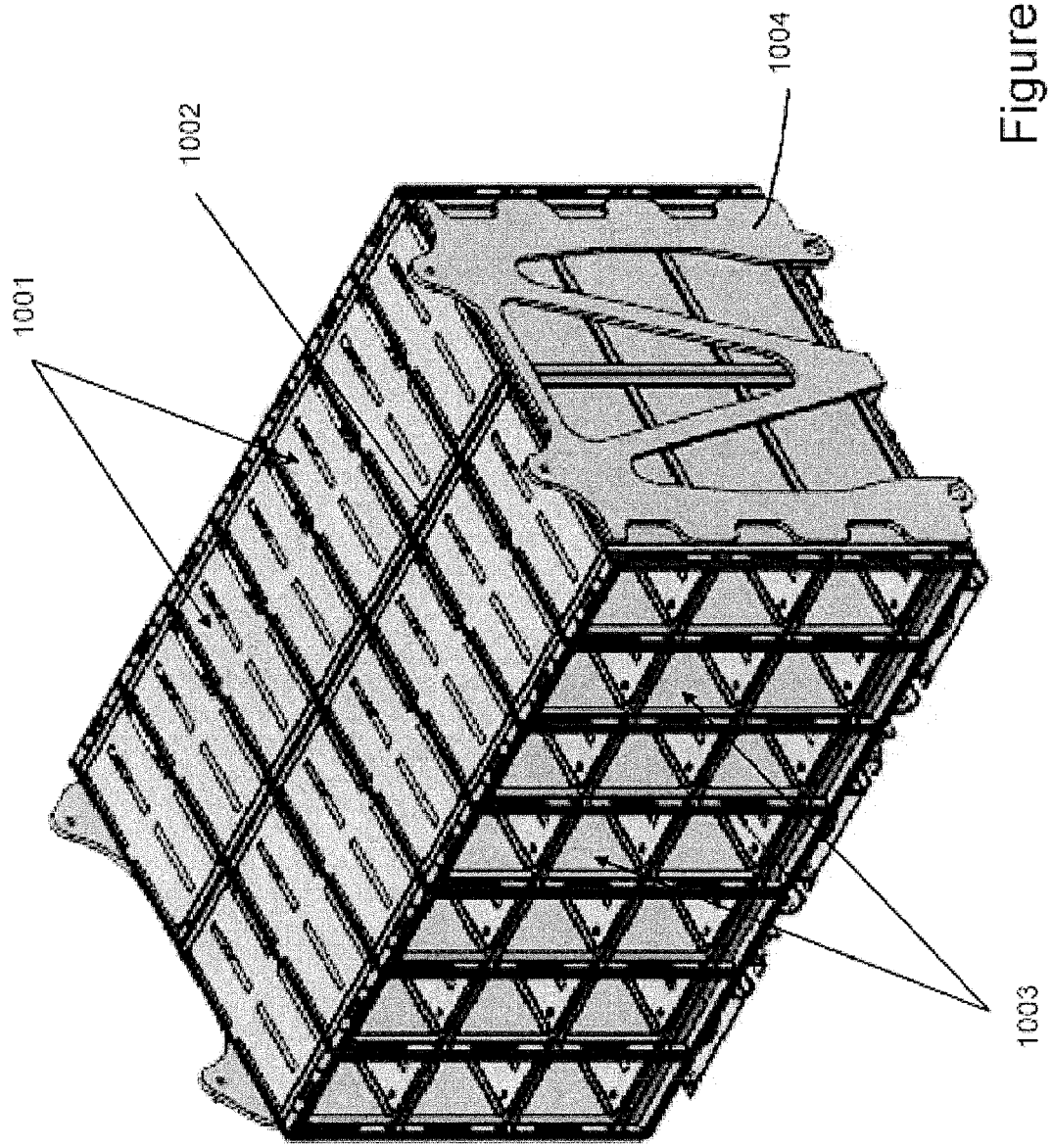
FIG. 10 is an isometric view of the battery rack structural attachment system.

FIG. 10 is an isometric view of a recent embodiment of the primary battery rack structural system. The rack is shown without cells installed. This figure shows horizontal fire walls 1001, a central vertical fire wall 1002 and spaces 1003 where battery cells are installed. An example of a retention plate 1004 is also shown. Such a retention plate may be used to remove the entire battery pack from the deck of a locomotive by a crane or other heavy lifting apparatus.

Figure 11:
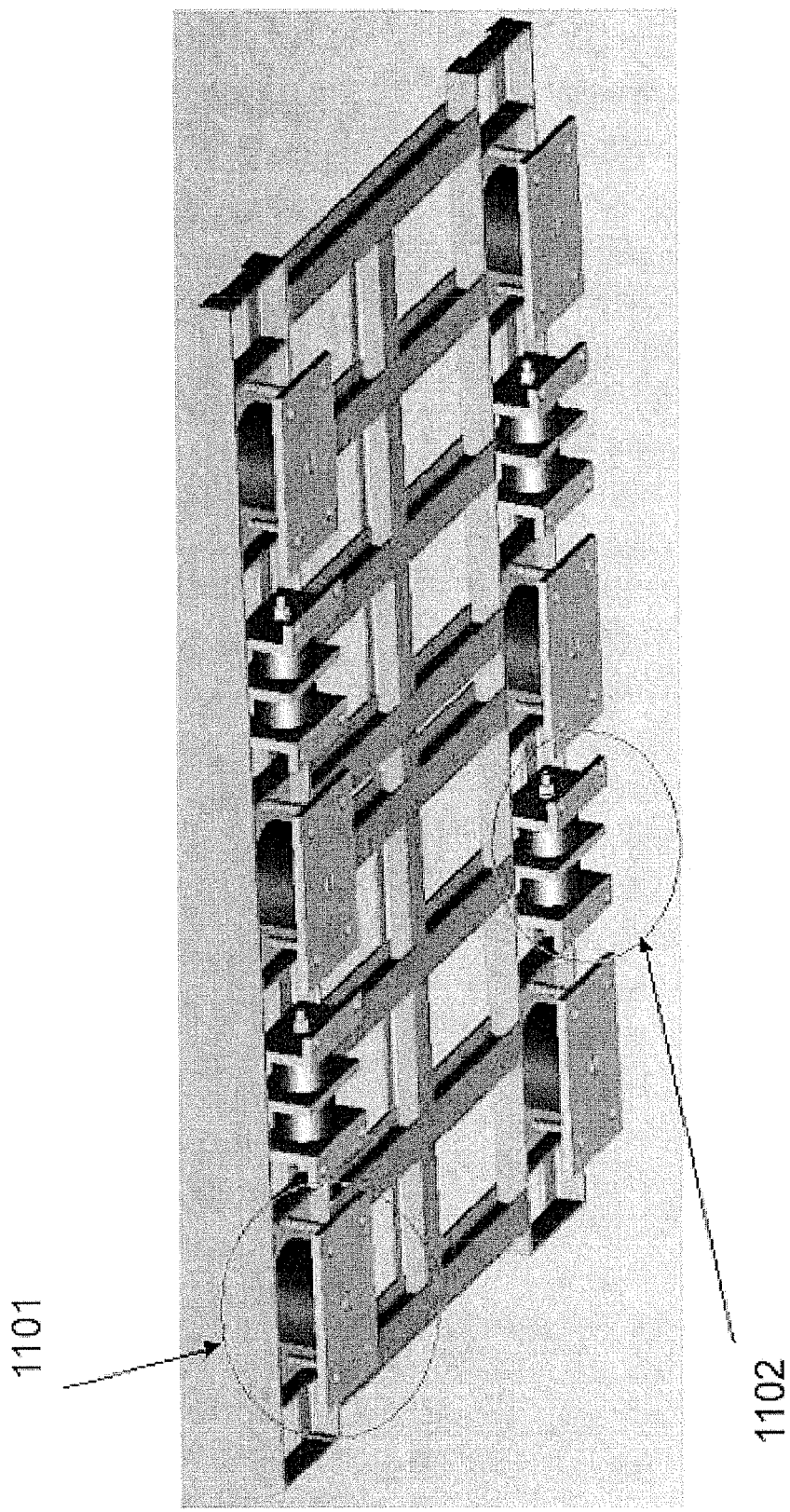
FIG. 11 shows battery pack suspension system elements.

FIG. 11 shows battery pack suspension system elements and illustrates shock absorbers or isolators 1101 and 1102. These isolators work in combination to provide vibration and shock isolation in all three principle locomotive directions—longitudinal, lateral and vertical. Isolators 1101 act to absorb primarily vertical shock and vibration but, because of their shear stiffness, also help mitigate shock and vibration in the side-to-side direction. Isolators 1101 also carry the dead weight of the battery rack. Longitudinal is along the travel axis of the locomotive and lateral is side-to-side. Isolators 1102 act to absorb primarily longitudinal shock and vibration but, because of their shear stiffness, also help mitigate shock and vibration in the side-to-side direction. Isolator assemblies 1102 are designed to limit longitudinal motion preferably to less than about 35 mm of total travel and more preferably to less than about 25 mm of total travel. However, during normal use the expected travel is less than about 7 mm. The maximum travel is limited to preferably less than about 35 mm of total travel and more preferably to less than about 25 mm of total travel to keep the battery racks from damaging the equipment at the ends of the racks and the adjoining structure such as electrical connectors, high voltage cabinet, generator-set hoods and the like. The above types type of isolators have a nonlinear spring-rate curve and become progressively stiffer as the dynamic motion increases. This reduces the shock load response at the lower shock inputs but reduces the amount of travel at the higher shock loads.

Figure 12:
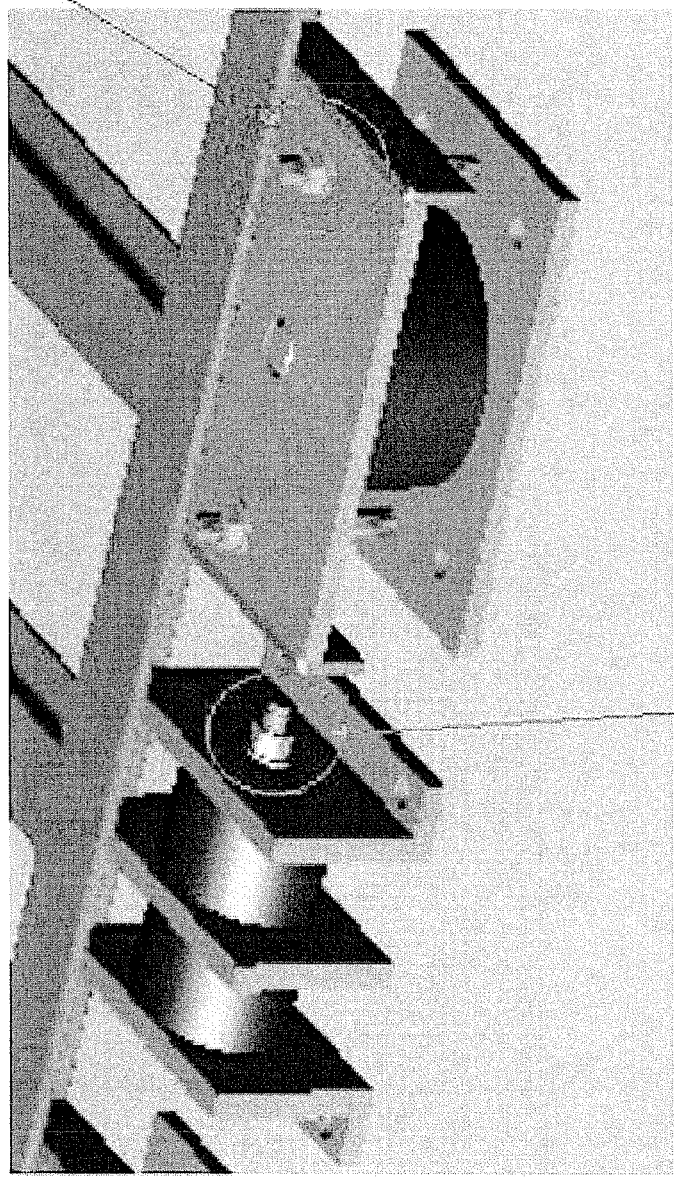
FIG. 12 shows additional battery pack suspension system elements.

FIG. 12 shows a close-up of shock absorber attachment 1202 for vertical shock and vibration, and shock absorber attachment 1201 for longitudinal shock and vibration. Attachment 1201 is preloaded to an initial preload during assembly so that under shock loading the 2 isolators of each assembly (assemblies 1102 in FIG. 11) act together. This preload is designed to keep the 2 isolators in compression for all expected shock loads. This reduces the total load going into each isolator.

Rack and Battery Retention Derailments

The following features of the battery rack provide retention of the rack to the locomotive deck and retention of the batteries in the rack during a locomotive derailment. The rack is mounted on shock isolators to reduce the load on the rack, batteries and accessory equipment for normal shock and vibration loads and motions. However, excessive motion stop features have been added that capture the rack during extraordinary locomotive events.

Figure 13:
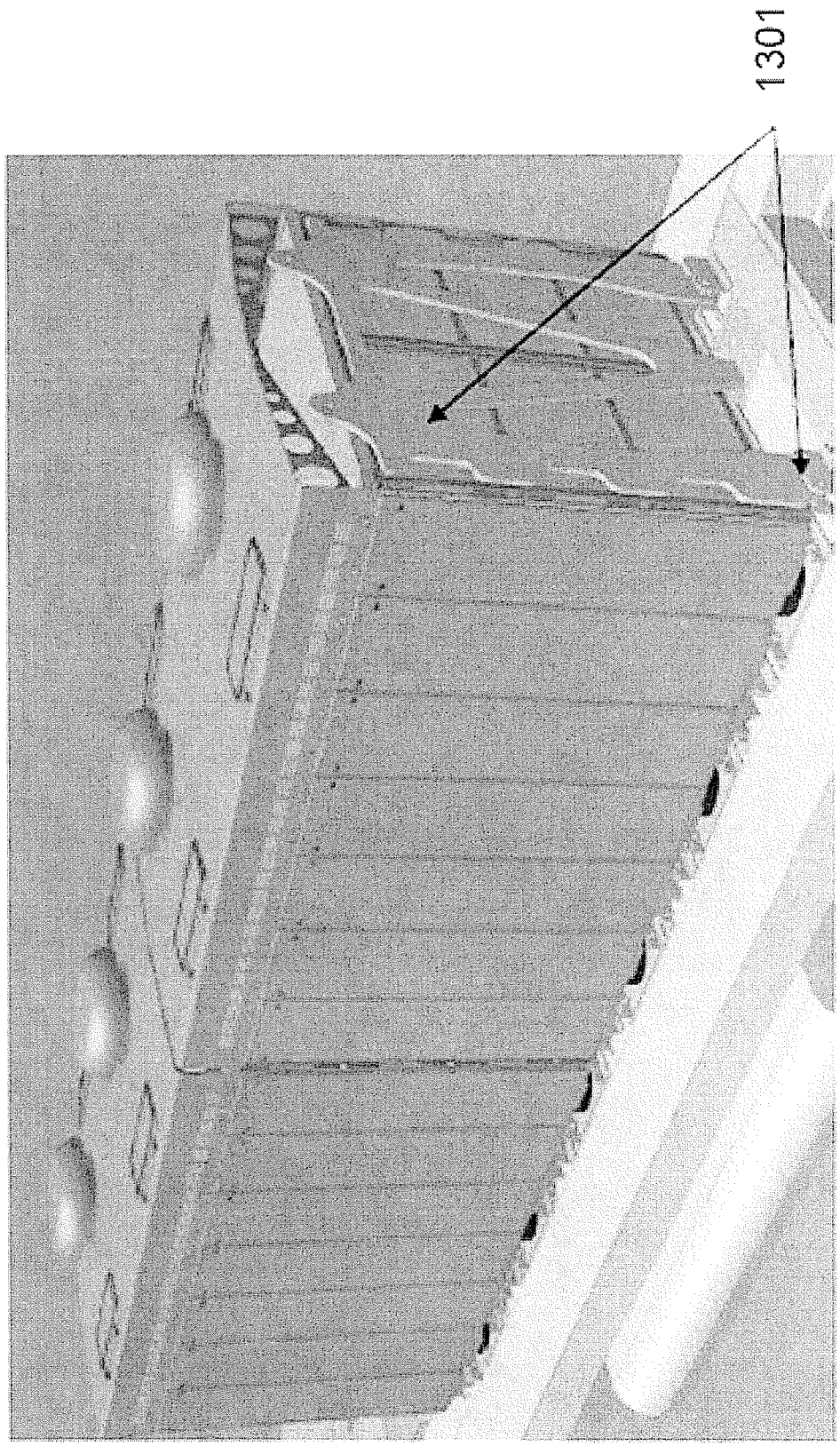
FIG. 13 illustrates a special battery pack retention system.

FIG. 13 shows an example of a support plate structure 1301 that provides this feature. The rack can move relative to the retaining pins allowing the isolators to move and attenuate the normal shock loads. The isolators also have retention and motion limiting features. For example, studs capture the excessive motion in the vertically upward and lateral and longitudinal directions. The combination of the support plates and the isolator retention studs retain the rack on the locomotive deck. Shock absorber attachment 1201, shock absorber attachment 1202 and support plate structure 1301 provide hard stops in all three directions. The amount of available travel is designed to allow isolation at the expected shock loads and each stop is centered so that this allowable motion can occur in the positive and negative directions. Support plate structure 1301 also provides lifting capabilities for the battery rack. This allows for lifting the rack above the center of gravity for safer lifting.

Figure 14:
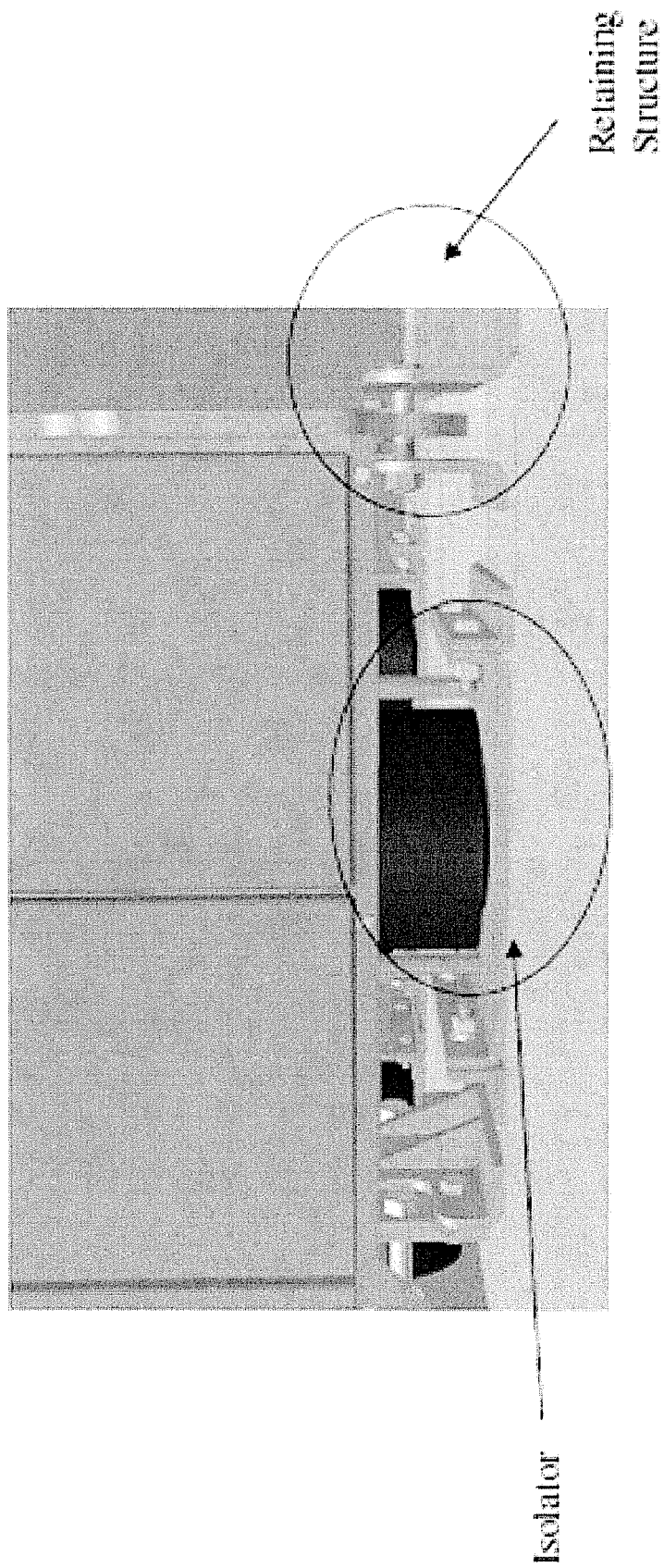
FIG. 14 shows rack isolators and retaining elements.

FIG. 14 shows a typical attachment of a battery cell tray to the rack structure. Each battery cell tray has a bolted attachment in the front of the rack and a slide in retainer at the center firewall of the rack.

Figure 15:
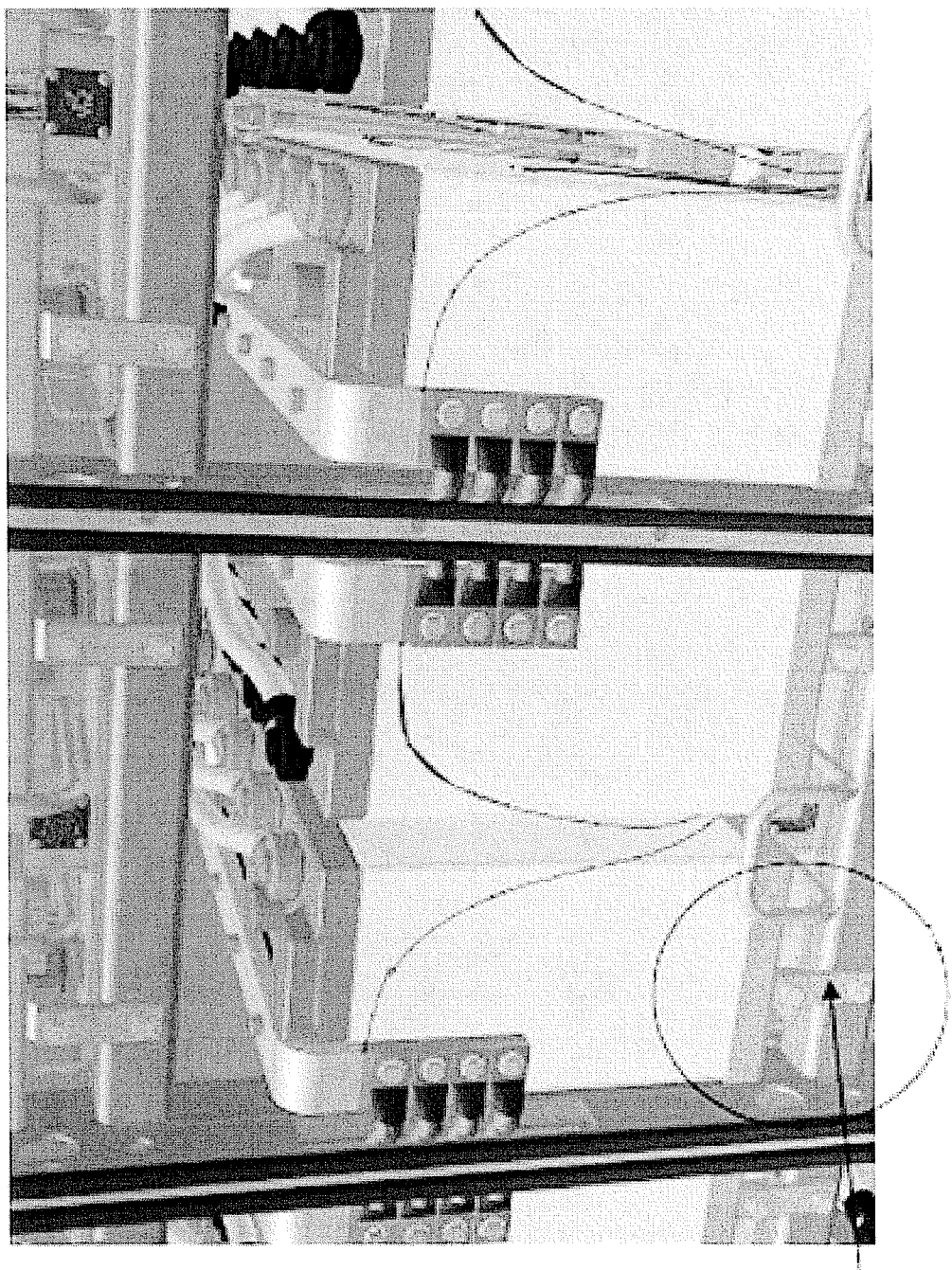
FIG. 15 illustrates a cell tray and rack attachment.

FIG. 15 shows a typical attachment of a battery cell tray to the rack structure. Each battery cell tray has a bolted attachment in the front of the rack and a slide in retainer at the center firewall of the rack.

Figure 16:
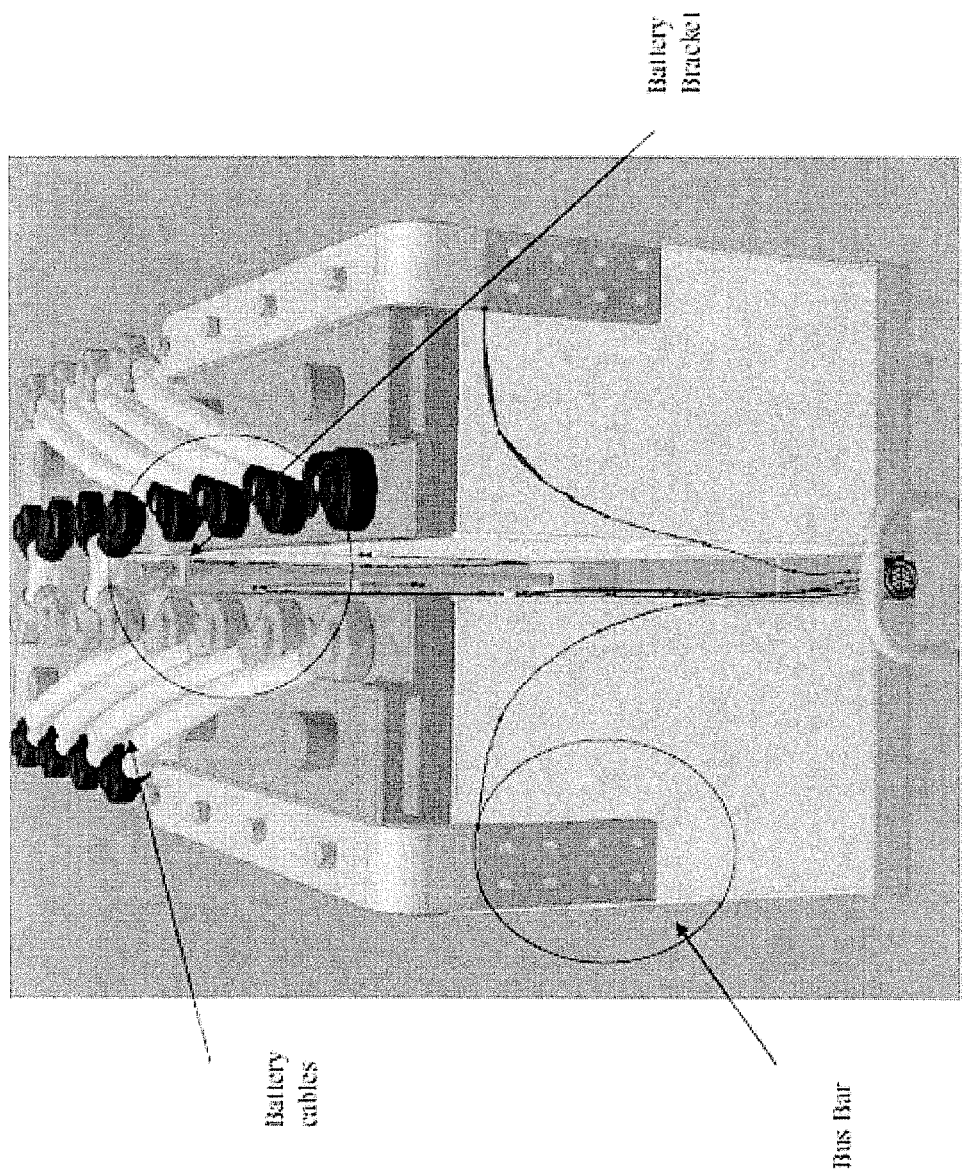
FIG. 16 illustrates a cell retention bracket.

FIG. 16 shows the retention features of the cells to the battery cell tray. In this example, there are four cells per row. The tray comprises a retaining bracket at the four inner corners of the four cells in each tray that is attached to the tray by a rod that is threaded into the base of the tray. Additional retention of the battery cells is provided by the battery rack doors shown in FIG. 13. Also the electrical cabling connecting the batteries to each other and the copper bus bars running from each tray set of batteries to the next tray set of batteries through a slot in the battery rack partition provide a supplemental retention shown in FIG. 16.

Maintenance and Servicing

The battery pack of the present invention is also designed for accessibility to the cells and ease of replacement under field conditions. Battery cell access is preferably from both sides of the battery pack. In some cases it is desirable to remove any cell in a tray from only one side, for example when removal equipment can only be positioned on that side. When removal equipment can be positioned on either side, it is most preferable to be able to remove the cell from the side of the pack closest to the cell that is to be removed. This results in the minimum number of other cells that need be removed in order to remove the desired cell. The design preferably also allows for lifting entire rack on or off the locomotive. The design more preferably allows for lifting only modules on or off the locomotive. The rack assembly is based on a modular design which can be easily configured for other applications (such as for a tugboat).

A number of variations and modifications of the invention can be used. As will be appreciated, it would be possible to provide for some features of the invention without providing others. For example in one alternative embodiment, the various inventive features are applied to vehicles other than locomotives, such as cars, gantry cranes, railroad cars, and trucks. The control logic set forth above may be implemented as a logic circuit, software, or as a combination of the two.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A hybrid vehicle, comprising:
    (a) a prime mover for generating electrical energy;
    (b) a battery pack for receiving, storing, and providing, as needed, the electrical energy, the battery pack comprising a plurality of battery cells;
    (c) at least one motor for consuming the electrical energy;
    (d) a rack structure, the rack structure comprising a plurality of vertical and horizontal fire wall members defining a plurality of containment sections, each section receiving a corresponding set of battery cells;
    (e) a hood assembly, the hood assembly comprising a chimney vent and hood and wall members respectively defining upper and lower plenums, the upper and lower plenums being in fluid communication with the chimney vent and separated by the wall member, the wall member inhibiting airflow between the upper and lower plenums, and the lower plenum being in fluid communication with and removing heated air from the battery pack; and (f) a plurality of airflow channels in communication with the lower plenum, a first set of airflow channels being positioned between adjacent battery cells and a second set of airflow channels being positioned between battery cells and the vertical fire wall members, the airflow channels in the first set having a first cross-sectional area normal to the direction of airflow and the airflow channels in the second set having a second cross-sectional area normal to the direction of airflow, and wherein the first cross-sectional area is greater than the second cross-sectional area, wherein heated air in the containment sections, the upper and lower plenums passes. by free convection, through the chimney vent and into the external environment.

2. The hybrid vehicle of claim 1, further comprising a fan positioned in a fan duct, the fan duct being in communication with the chimney vent, wherein when the battery pack is less than a first temperature, the fan is disabled and removal of heated air from the battery pack is done by free convection alone, and wherein when the battery pack is more than a second temperature, the fan is enabled and removal of at least a portion of heated air from the battery pack is done by forced convection, and wherein a plane of the fan is positioned below a plurality of louvres in the hood member, the louvres permitting air in the external environment to enter into the upper plenum.

3. The hybrid vehicle of claim 1, further comprising a second plurality of airflow channels, the second plurality of airflow channels being transverse to the plurality of airflow channels and being positioned above and/or below the plurality of cells.

4. The hybrid vehicle of claim 1, wherein a fire in one section is retarded from spreading to an adjacent section and wherein closure members are positioned to inhibit airflow between adjacent containment sections in the event of the fire.

5. The hybrid vehicle of claim 1, further comprising a fan positioned in a fan duct, the fan duct being in communication with the chimney vent, wherein when the battery pack is less than a first temperature, the fan is disabled and removal of heated air from the battery pack is done by free convection alone, and wherein when the battery pack is more than a second temperature, the fan is enabled and removal of at least a portion of heated air from the battery pack is done by forced convection.

6. The hybrid vehicle of claim 1, further comprising a plurality of vertical and longitudinal shock absorbers, a set of vertical and longitudinal shock absorbers being positioned in each containment section to absorb at least a portion of shock imparted to the absorbers by movement of and impacts to the vehicle.

7. The hybrid vehicle of claim 6, wherein each cell is able to withstand shock loading of no less than 2 gs in the longitudinal direction, no less than about 0.25 gs in the vertical direction, and no less than about 0.1 g lateral acceleration.

8. The hybrid vehicle of claim 6, wherein each cell is able to withstand constant vibration loading of no less than 0.00003-in deflection at 100 cycles per second and 0.03-in deflection at 1 cps.

9. The hybrid vehicle of claim 1, further comprising an electrically insulating material positioned between the rack structure and a supporting deck of the vehicle and/or between each cell and a supporting member in the rack structure.

10. The hybrid vehicle of claim 1, further comprising a support plate structure supporting the rack structure, the support plate structure being operable to permit and limit movement of the rack structure relative to the support plate structure.

11. A method for operating a hybrid vehicle, comprising:
(a) generating, by a prime mover, electrical energy;
(b) receiving, storing, and providing, as needed and by a battery pack, the electrical energy, the battery pack comprising a plurality of battery cells;
(c) providing to at least one motor the electrical energy;
(d) providing a rack structure, the rack structure comprising a plurality of vertical and horizontal fire wall members defining a plurality of containment sections, each section receiving a corresponding set of battery cells,
(e) passing heated air by free convection through upper and/or lower plenums and through a chimney vent into the ambient atmosphere, wherein a hood assembly comprises the chimney vent and hood and wall members respectively defining the upper and lower plenums, the upper and lower plenums being in fluid communication with the chimney vent and separated by the wall member, the wall member inhibiting airflow between the upper and lower plenums, and the lower plenum being in fluid communication with and removing heated air from the battery pack; and
(f) passing heated air by free convention through a plurality of airflow channels in communication with the lower plenum, a first set of airflow channels being positioned between adjacent battery cells and a second set of airflow channels being positioned between battery cells and the wall member, the airflow channels in the first set having a first cross-sectional area normal to the direction of airflow and the airflow channels in the second set having a second cross-sectional area normal to the direction of airflow, and wherein the first cross-sectional area is greater than the second cross-sectional area.

12. The method of claim 11, further comprising the step of providing a fan positioned in a fan duct, the fan duct being in communication with the chimney vent, wherein when the battery pack is less than a first temperature, the fan is disabled and removal of heated air from the battery pack is done by free convection alone, and wherein when the battery pack is more than a second temperature, the fan is enabled and removal of heated air from the battery pack is done by forced convection, and wherein a plane of the fan is positioned below a plurality of louvres in the hood member, the louvres permitting air in the external environment to enter into the upper plenum.

13. The method of claim 11, further comprising a second plurality of airflow channels, the second plurality of airflow channels being transverse to the plurality of airflow channels and being positioned above and/or below the plurality of cells.

14. The method of claim 11, wherein closure members are positioned to inhibit airflow between adjacent containment sections in the event of a fire.

15. The method of claim 11, further comprising the step of providing a fan positioned in a fan duct, the fan duct being in communication with the chimney vent, wherein when the battery pack is less than a first temperature, the fan is disabled and removal of heated air from the battery pack is done by free convection alone, and wherein when the battery pack is more than a second temperature, the fan is enabled and removal of heated air from the battery pack is done by forced convection.

16. The method of claim 11, further comprising the step of providing a plurality of vertical and longitudinal shock absorbers, a set of vertical and longitudinal shock absorbers being positioned in each containment section to absorb at least a portion of shock imparted to the absorbers by movement of and impacts to the vehicle.

17. The method of claim 16, wherein each cell is able to withstand shock loading of no less than 2 gs in the longitudinal direction, no less than about 0.25 gs in the vertical direction, and no less than about 0.1 g lateral acceleration.

18. The method of claim 16, wherein each cell is able to withstand constant vibration loading of no less than 0.00003-m deflection at 100 cycles per second and 0.03-m deflection at 1 cps.

19. The method of claim 11, further comprising the step of positioning an electrically insulating material between the rack structure and a supporting deck of the vehicle and/or between each cell and a supporting member in the rack structure.

20. The method of claim 11, further comprising the step of providing a support plate structure, the support plate structure supporting the rack structure and being operable to permit and limit movement of the rack structure relative to the support plate structure.

* * * * *